(12) United States Patent
Farah et al.

(10) Patent No.: US 10,393,282 B2
(45) Date of Patent: Aug. 27, 2019

(54) MULTIDIRECTIONAL VENT LIMITING DEVICES FOR USE WITH FLUID REGULATORS

(71) Applicant: Emerson Process Management Regulator Technologies, Inc., McKinney, TX (US)

(72) Inventors: Hoden Ali Farah, Plano, TX (US); Roy Ronald Pelfrey, Sherman, TX (US); Tung Kim Nguyen, McKinney, TX (US); Bruno Jean Michel Cheron, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 88 days.

(21) Appl. No.: 15/597,525

(22) Filed: May 17, 2017

(65) Prior Publication Data
US 2018/0335158 A1    Nov. 22, 2018

(51) Int. Cl.
*F16K 31/12* (2006.01)
*F16K 17/34* (2006.01)
(Continued)

(52) U.S. Cl.
CPC .............. *F16K 17/34* (2013.01); *F16K 17/30* (2013.01); *F16K 37/0008* (2013.01); *G05D 1/00* (2013.01);
(Continued)

(58) Field of Classification Search
CPC ......... Y10T 137/7785; Y10T 137/7792; Y10T 137/7835; Y10T 137/7847; Y10T 137/7869
(Continued)

(56) References Cited

U.S. PATENT DOCUMENTS

| 2,591,060 A | * | 4/1952 | Garretson | F16K 17/30 137/513.3 |
| 3,469,605 A | * | 9/1969 | Courtot | F16K 17/30 137/498 |

(Continued)

OTHER PUBLICATIONS

International Searching Authority, "International Search Report and Written Opinion," issued in connection with International Patent Application No. PCT/US2018/030165, dated Jul. 20, 2018, 13 pages.
(Continued)

*Primary Examiner* — Robert K Arundale
(74) *Attorney, Agent, or Firm* — Hanley, Flight & Zimmerman, LLC

(57) ABSTRACT

Multidirectional vent limiting devices for use with fluid regulators are described. In some examples, a vent limiting device includes a housing having an interior surface, a fluid inlet, a fluid outlet, and a first fluid passageway in fluid communication with and located between the fluid inlet and the fluid outlet. The interior surface includes a first sealing surface that defines a portion of the first fluid passageway. In some examples, the vent limiting device further includes a stem and a poppet. In some examples, the stem is rigidly coupled to the interior surface of the housing. In some examples, the poppet includes a second sealing surface that defines a portion of the first fluid passageway, and a radial bore that defines a second fluid passageway in fluid communication with and located between the fluid inlet and the fluid outlet. In some examples, the poppet is slidable along the stem between an open position and a closed position. In some examples, the second sealing surface contacts the first sealing surface when the poppet is in the closed position to close off the first fluid passageway.

18 Claims, 15 Drawing Sheets

(51) Int. Cl.
*G05D 16/04* (2006.01)
*F16K 37/00* (2006.01)
*F16K 17/30* (2006.01)
*G05D 1/00* (2006.01)

(52) U.S. Cl.
CPC ........ *G05D 16/04* (2013.01); *Y10T 137/7785* (2015.04)

(58) Field of Classification Search
USPC ..................................................... 138/44, 45
See application file for complete search history.

(56) References Cited

U.S. PATENT DOCUMENTS

| | | | |
|---|---|---|---|
| 3,877,489 A | | 4/1975 | Louie et al. |
| 3,910,306 A | * | 10/1975 | Ohrn ........................ F16K 17/34 |
| | | | 137/498 |
| 4,022,113 A | | 5/1977 | Blatt |
| 4,174,731 A | * | 11/1979 | Sturgis ..................... F16K 17/26 |
| | | | 137/498 |
| 4,456,029 A | * | 6/1984 | McCrum .................. F16K 17/30 |
| | | | 137/498 |
| 5,293,898 A | * | 3/1994 | Masloff .................... F16K 17/30 |
| | | | 137/498 |
| 2005/0092368 A1 | | 5/2005 | Tahir et al. |
| 2008/0178946 A1 | * | 7/2008 | Lea-Wilson ............. F16K 17/30 |
| | | | 137/460 |
| 2011/0284104 A1 | | 11/2011 | Gutierrez |
| 2012/0048403 A1 | * | 3/2012 | Chappel .............. A61M 27/006 |
| | | | 137/543 |

OTHER PUBLICATIONS

Gas Pressure Regulators Catalog, Maxitrol Company, 2013, 6 pages.
VLimiter® Vent Limiting Device Maximum Allowable Venting Rate, 1 page.
Vent Limiter, Maxitrol, retrieved from http://www.maxitrol.com/ventlimiting.html on Apr. 19, 2017, 2 pages.

* cited by examiner

US 10,393,282 B2

MULTIDIRECTIONAL VENT LIMITING DEVICES FOR USE WITH FLUID REGULATORS

FIELD OF THE DISCLOSURE

This disclosure relates generally to vent limiting devices and, more specifically, to multidirectional vent limiting devices for use with fluid regulators.

BACKGROUND

Indoor installation and/or use of a fluid regulator typically requires the installation of vent away piping routed from a vent of the fluid regulator to a location outside of the building and/or facility inside of which the fluid regulator is to be installed and/or used. The installation of vent away piping increases the cost of installing and/or using the fluid regulator, and also requires additional steps to ensure the overall safety and reliability of the operation of the fluid regulator.

The installation of a vent limiting device on an indoor fluid regulator may eliminate the need for vent away piping and, as a result, decrease the cost of installing and/or using the fluid regulator, and also reduce the number of steps to ensure the overall safety and reliability of the operation of the fluid regulator. Conventional vent limiting devices for use with indoor fluid regulators are operated in part via gravity and, accordingly, must be installed in a vertical orientation.

SUMMARY

Multidirectional vent limiting devices for use with fluid regulators are disclosed. In some examples, a first multidirectional vent limiting device is disclosed. In some disclosed examples, the first multidirectional vent limiting device comprises a housing having an interior surface, a fluid inlet, a fluid outlet, and a first fluid passageway in fluid communication with and located between the fluid inlet and the fluid outlet. In some disclosed examples, the interior surface includes a first sealing surface that defines a portion of the first fluid passageway. In some disclosed examples, the first multidirectional vent limiting device further comprises a stem having a first end, a second end located opposite the first end, and an axial portion located between the first end and the second end. In some disclosed examples, the first end of the stem is rigidly coupled to the interior surface of the housing. In some disclosed examples, the first multidirectional vent limiting device further comprises a poppet having a first end, a second end located opposite the first end, a second sealing surface that defines a portion of the first fluid passageway, and a radial bore that defines a second fluid passageway in fluid communication with and located between the fluid inlet and the fluid outlet. In some disclosed examples, the poppet is slidable along the axial portion of the stem between an open position and a closed position. In some disclosed examples, the second sealing surface contacts the first sealing surface when the poppet is in the closed position to close off the first fluid passageway.

In some examples, a second multidirectional vent limiting device is disclosed. In some disclosed examples, the second multidirectional vent limiting device comprises a housing having an interior surface, a fluid inlet, a fluid outlet, and a first fluid passageway in fluid communication with and located between the fluid inlet and the fluid outlet. In some disclosed examples, the interior surface includes a first sealing surface that defines a portion of the first fluid passageway. In some disclosed examples, the second multidirectional vent limiting device further comprises a stem having a first end, a second end located opposite the first end, and an axial portion located between the first end and the second end. In some disclosed examples, the second end of the stem is rigidly coupled to the interior surface of the housing. In some disclosed examples, the second multidirectional vent limiting device further comprises a retaining nut coupled to the first end of the stem. In some disclosed examples, the second multidirectional vent limiting device further comprises a poppet having a first end, a second end located opposite the first end, a second sealing surface that defines a portion of the first fluid passageway, and a radial bore that defines a second fluid passageway in fluid communication with and located between the fluid inlet and the fluid outlet. In some disclosed examples, the poppet is slidable along the axial portion of the stem between an open position and a closed position. In some disclosed examples, the second sealing surface contacts the first sealing surface when the poppet is in the closed position to close off the first fluid passageway.

In some examples, a third multidirectional vent limiting device is disclosed. In some disclosed examples, the third multidirectional vent limiting device comprises a housing having an interior surface, a fluid inlet, a fluid outlet, and a first fluid passageway in fluid communication with and located between the fluid inlet and the fluid outlet. In some disclosed examples, the interior surface includes a first sealing surface that defines a portion of the first fluid passageway. In some disclosed examples, the third multidirectional vent limiting device further comprises a stem having a first end, a second end located opposite the first end, and an axial portion located between the first end and the second end. In some disclosed examples, the third multidirectional vent limiting device further comprises a poppet having a first end, a second end located opposite the first end, a second sealing surface that defines a portion of the first fluid passageway, and a radial bore that defines a second fluid passageway in fluid communication with and located between the fluid inlet and the fluid outlet. In some disclosed examples, the first end of the stem is rigidly coupled to the poppet. In some disclosed examples, the poppet is slidable in an axial direction within the housing between an open position and a closed position. In some disclosed examples, the second sealing surface contacts the first sealing surface when the poppet is in the closed position to close off the first fluid passageway.

Figure 1:
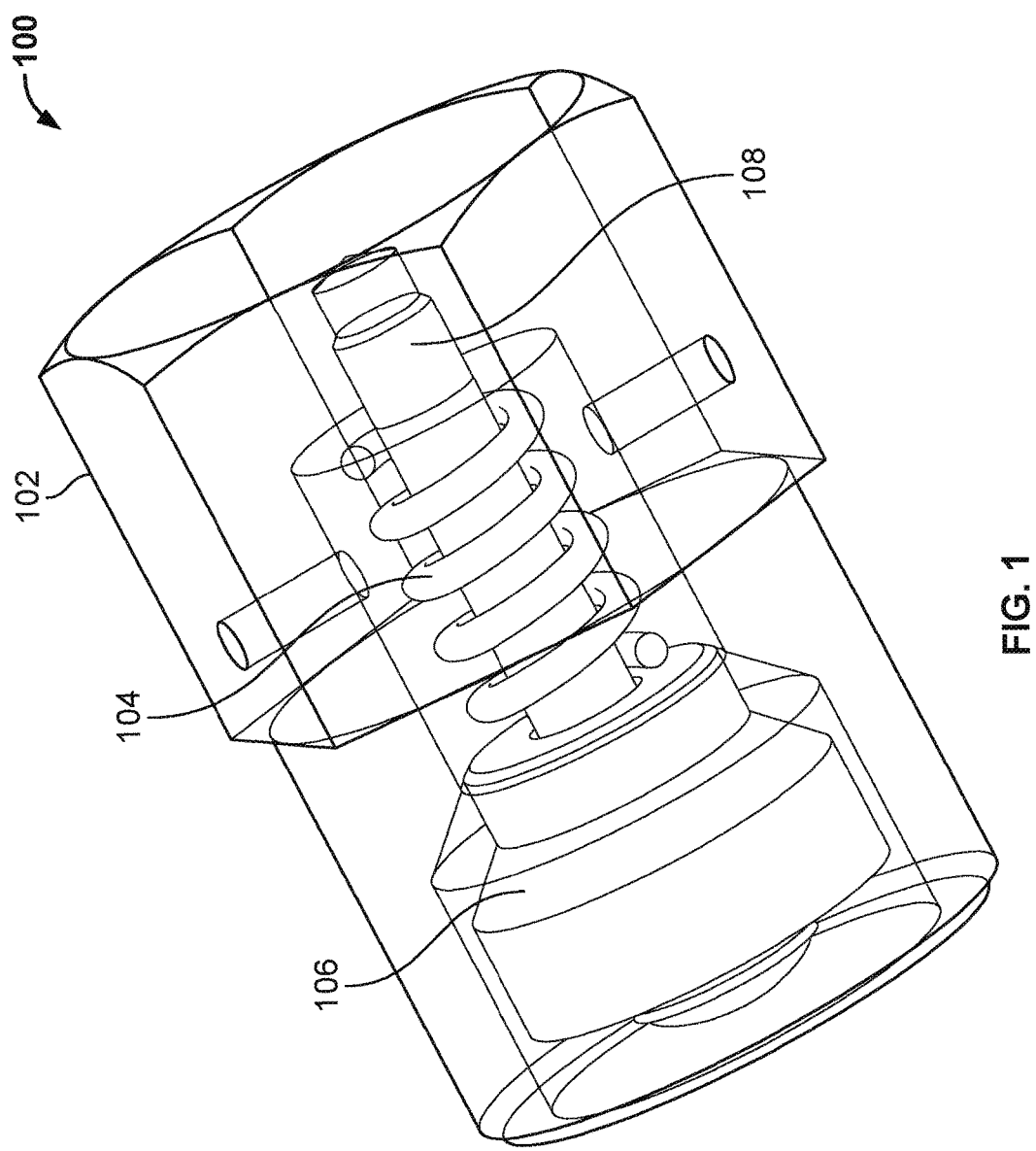
FIG. 1 is a perspective view of a first example multidirectional vent limiting device for use with a fluid regulator.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

The installation of a vent limiting device on an indoor fluid regulator may eliminate the need for vent away piping and, as a result, decrease the cost of installing and/or using the fluid regulator, and also reduce the number of steps to ensure the overall safety and reliability of the operation of the fluid regulator. Conventional vent limiting devices for use with indoor fluid regulators are operated in part via gravity and, accordingly, must be installed in a vertical orientation.

Unlike the conventional vent limiting devices described above that must be installed in a vertical orientation to be operable, the example multidirectional vent limiting devices disclosed herein include mechanical structures that are operable without regard to the installation orientation of such example multidirectional vent limiting devices on a fluid regulator. The disclosed multidirectional vent limiting devices are accordingly operable in any orientation, including vertical orientations (e.g., orientations in which a central and/or longitudinal axis of the multidirectional vent limiting device is aligned with the downward direction of a gravitational force) as well as horizontal and/or other non-vertical orientations (e.g., orientations in which a central and/or longitudinal axis of the multidirectional vent limiting device is not aligned with the downward direction of a gravitational force).

In some examples, the disclosed multidirectional vent limiting devices advantageously identify operational state(s) (e.g., open or closed) and/or operational parameter(s) (e.g., pressure, position) associated with one or more structure(s) and/or component(s) (e.g., internal structure(s) and/or component(s)) of the multidirectional vent limiting devices and/or a fluid passing therethrough. In some examples, the disclosed multidirectional vent limiting devices may indicate the operational state(s) and/or operational parameter(s) in a visual manner. For example, an externally-visible component of the multidirectional vent limiting devices may appear in a first position when the multidirectional vent limiting device is open, and in a second position different from the first position when the multidirectional vent limiting device is closed. In other examples, the disclosed multidirectional vent limiting devices may include one or more transducer(s) (e.g., a pressure transducer, a position transducer, etc.) that identify the operational state(s) and/or operational parameter(s) by sensing data associated with the operational state(s) and/or operational parameter(s) and transmitting one or more signal(s) including and/or based on such data to a remotely located device that detects and/or interprets the data included in and/or represented by the transmitted signal(s).

Figure 2:
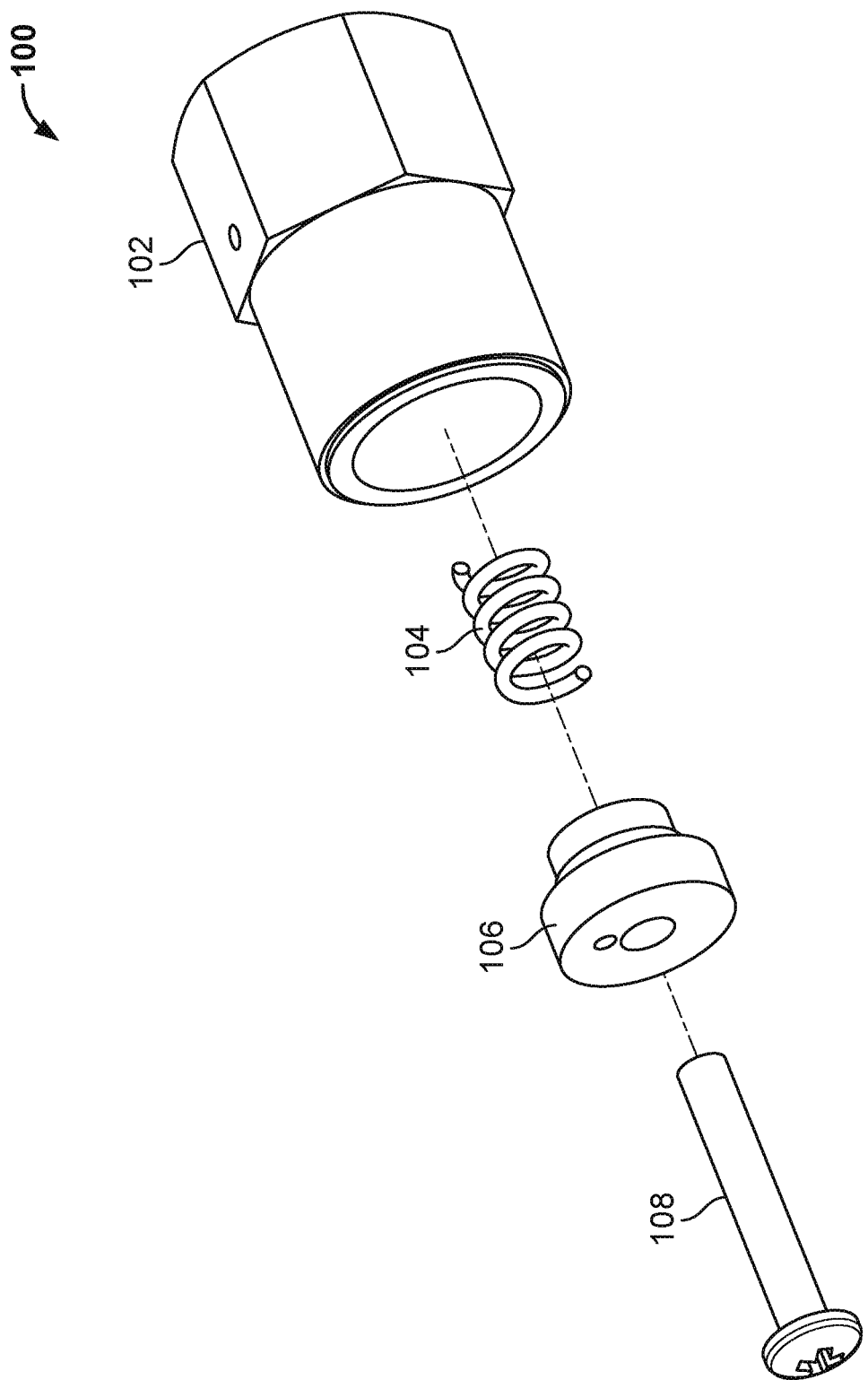
FIG. 2 is an exploded view of the first example multidirectional vent limiting device of FIG. 1.
Figure 3:
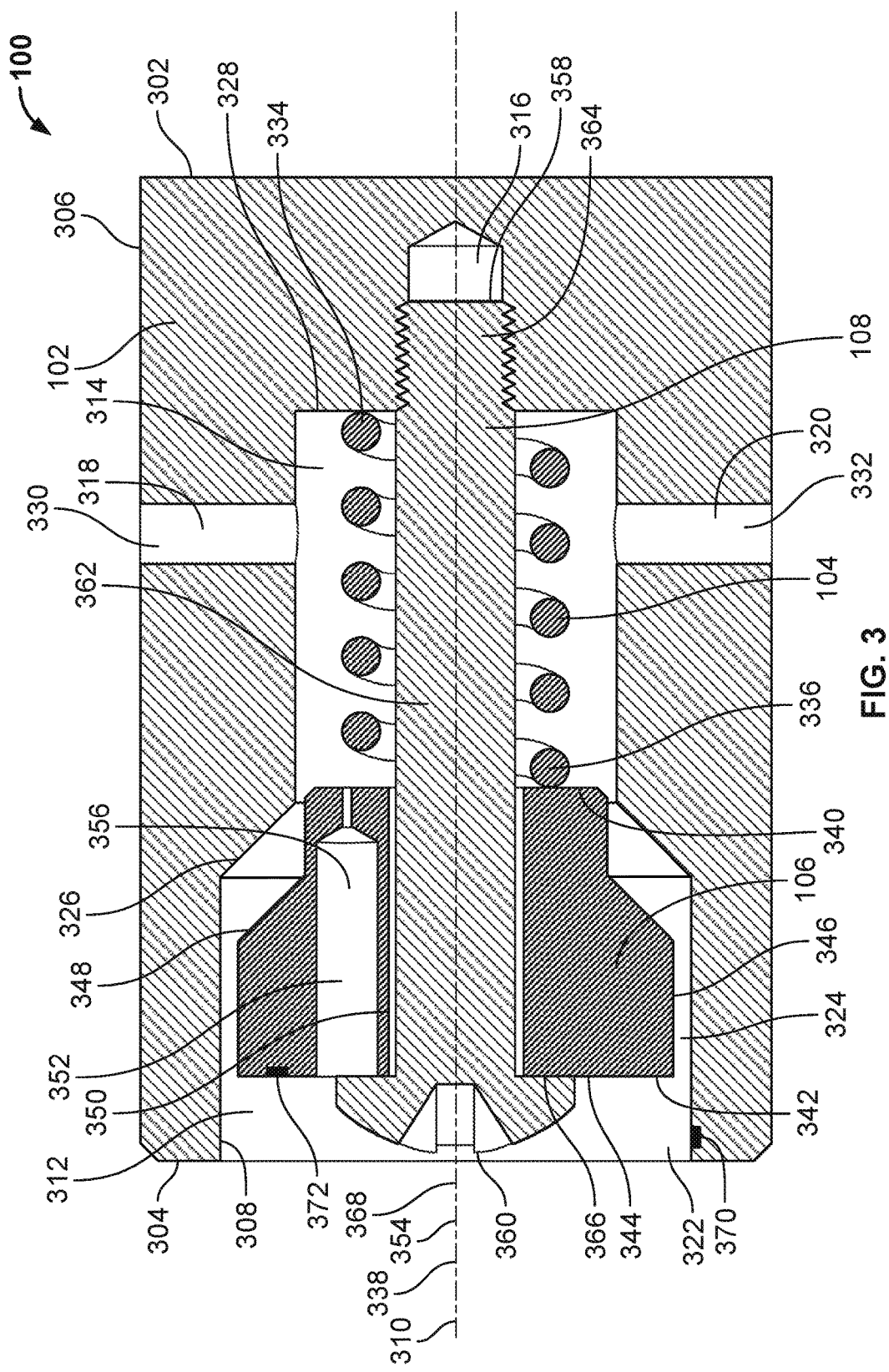
FIG. 3 is a cross-sectional view of the first example multidirectional vent limiting device of FIGS. 1 and 2 in an example open position.
Figure 4:
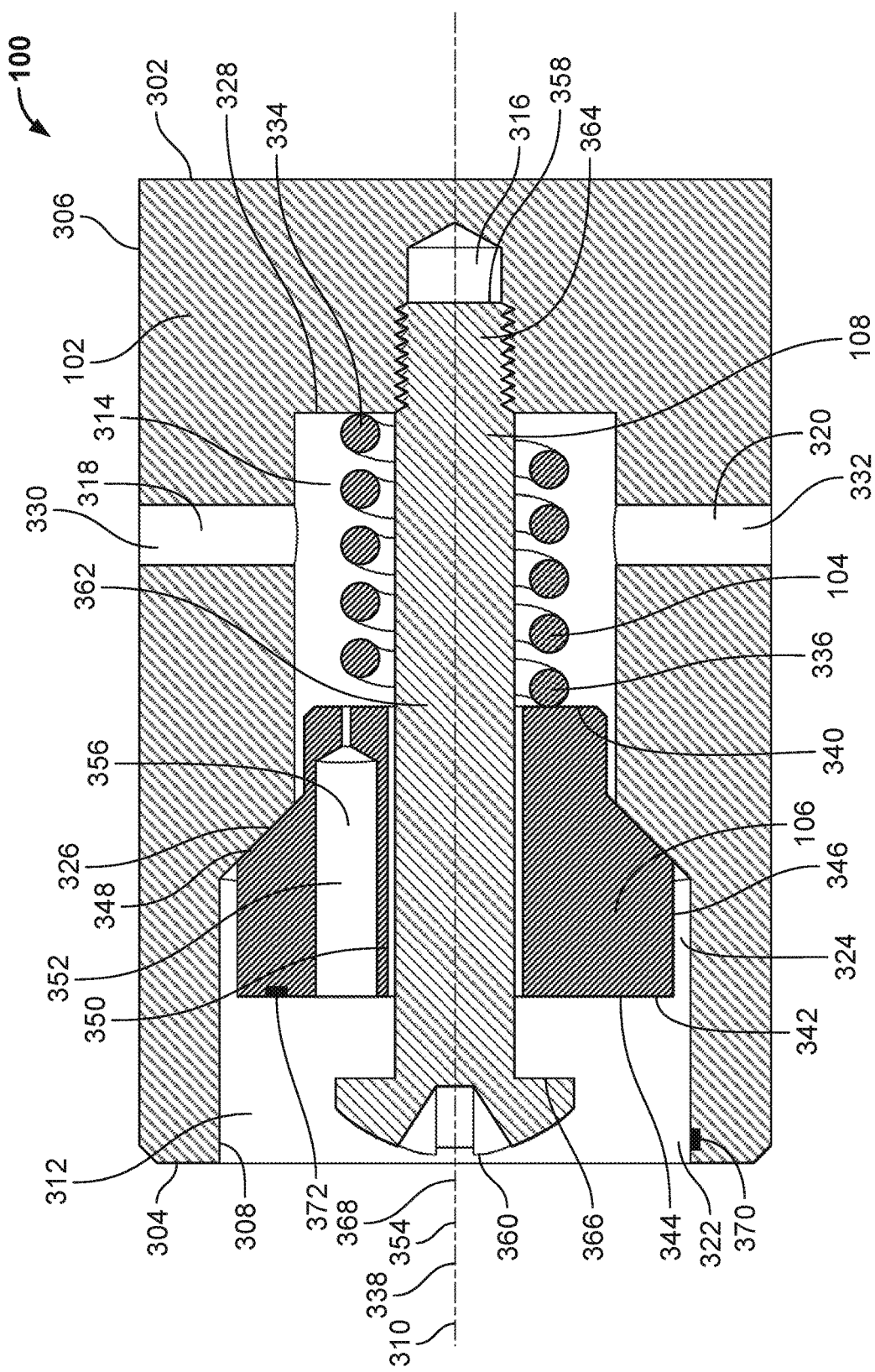
FIG. 4 is a cross-sectional view of the first example multidirectional vent limiting device of FIGS. 1-3 in an example closed position.

FIG. 1 is a perspective view of a first example multidirectional vent limiting device 100 for use with a fluid regulator. FIG. 2 is an exploded view of the first example multidirectional vent limiting device 100 of FIG. 1. FIG. 3 is a cross-sectional view of the first example multidirectional vent limiting device 100 of FIGS. 1 and 2 in an example open position. FIG. 4 is a cross-sectional view of the first example multidirectional vent limiting device 100 of FIGS. 1-3 in an example closed position. The multidirectional vent limiting device 100 of FIGS. 1-4 includes an example housing 102 (shown in phantom in FIG. 1), an example spring 104, an example poppet 106, and an example stem 108.

The housing 102 of the multidirectional vent limiting device 100 of FIGS. 1-4 includes an example first end 302, an example second end 304 located opposite the first end 302, an example exterior surface 306 (e.g., an exterior and/or peripheral wall), and an example interior surface 308 (e.g., an interior wall). The second end 304 of the housing 102 is shaped and/or configured to be inserted into and/or coupled to a casing of a fluid regulator. The exterior surface 306 and/or the interior surface 308 define(s) an example central axis 310 of the housing 102. In some examples, a portion of the exterior surface 306 proximate the second end 304 of the housing 102 may be threaded to facilitate the formation of a threaded connection between the housing 102 of the multidirectional vent limiting device 100 and a casing of a fluid regulator to which the housing 102 of the multidirectional vent limiting device 100 is to be coupled. In the illustrated example of FIGS. 1-4, the exterior surface 306 of the housing 102 has a generally cylindrical shape. In other examples, the exterior surface 306 of the housing 102 may be of a different shape (e.g., cubic, prismatic, conical, pyramidal, spherical, etc.).

The housing 102 of the multidirectional vent limiting device 100 of FIGS. 1-4 further includes a first example cavity 312, a second example cavity 314, a third example cavity 316, a fourth example cavity 318, and a fifth example cavity 320. In the illustrated example of FIGS. 1-4, the first cavity 312, second cavity 314, third cavity 316, fourth cavity 318, and fifth cavity 320 of the housing 102 define, and/or are defined by, the interior surface 308 of the housing 102. In some examples, the housing 102 may include additional and/or fewer cavities relative to the number of cavities shown and described in connection with the housing 102 of the multidirectional vent limiting device 100 of FIGS. 1-4.

In the illustrated example of FIGS. 1-4, the first cavity 312 of the housing 102 is shaped and/or configured to receive and/or house the poppet 106 of the multidirectional vent limiting device 100. The first cavity 312 of the housing 102 is also shaped and/or configured to receive and/or house a retaining flange (described below) and part of an axial portion (described below) of the stem 108 of the multidirectional vent limiting device 100. The first cavity 312 of the housing 102 defines and/or includes an example fluid inlet 322 of the multidirectional vent limiting device 100 located proximate the second end 304 of the housing 102. The first cavity 312 of the housing 102 also defines and/or includes a first example fluid passageway 324 (e.g., a primary fluid passageway) located between an outer surface (described below) of the poppet 106 of the multidirectional vent limiting device 100 and the interior surface 308 of the housing 102 of the multidirectional vent limiting device 100.

The first cavity 312 of the housing 102 of FIGS. 1-4 also defines and/or includes an example sealing surface 326. The sealing surface 326 of the first cavity 312 is shaped and/or configured to mate with a complementary-shaped and/or complementary-configured sealing surface (described below) of the poppet 106 to close off the first fluid passageway 324 when the multidirectional vent limiting device 100 is in a closed position, such as the example closed position shown in FIG. 4. In the illustrated example of FIGS. 1-4, the sealing surface 326 of the first cavity 312 has an angled and/or beveled profile relative to the remainder of the first cavity 312. In other examples, the sealing surface 326 may have a different shape and/or profile (e.g., curved, s-shaped, etc.).

The second cavity 314 of the housing 102 of FIGS. 1-4 is shaped and/or configured to receive and/or house the spring 104 and part of the axial portion of the stem 108 of the multidirectional vent limiting device 100. The second cavity 314 of the housing 102 is in fluid communication with the first cavity 312 of the housing 102. The second cavity 314 of the housing 102 defines and/or includes an example spring seat 328 to support a first end (described below) of the spring 104 of the multidirectional vent limiting device 100 of FIGS. 1-4.

The third cavity 316 of the housing 102 of FIGS. 1-4 is shaped and/or configured to receive a first end (described below) of the stem 108 of the multidirectional vent limiting device 100. In the illustrated example of FIGS. 1-4, the stem 108 is rigidly coupled to the housing 102 via a threaded connection formed by and/or between a threaded portion (described below) of the first end of the stem 108 and complementary threading located and/or formed within the third cavity 316 of the housing 102.

In the illustrated example of FIGS. 1-4, the fourth cavity 318 and the fifth cavity 320 of the housing 102 are respectively in fluid communication with the second cavity 314 of the housing 102. The fourth cavity 318 of the housing 102 extends from the second cavity 314 of the housing 102 to the exterior surface 306 of the housing 102. The fourth cavity 318 of the housing 102 defines and/or includes a first example fluid outlet 330 of the multidirectional vent limiting device 100. The fifth cavity 320 of the housing 102 also extends from the second cavity 314 of the housing 102 to the exterior surface 306 of the housing 102. The fifth cavity 320 of the housing 102 defines and/or includes a second example fluid outlet 332 of the multidirectional vent limiting device 100.

In the illustrated example of FIGS. 1-4, the fourth cavity 318 and/or the first fluid outlet 330 extend(s) radially from the central axis 310 of the housing 102 in a first direction that is opposite to a second direction in which the fifth cavity 320 and/or the second fluid outlet 332 extend(s) radially from the central axis 310 of the housing 102. In other examples, the housing 102 may include additional and/or fewer fluid outlets relative to the number of fluid outlets shown and described in connection with the multidirectional vent limiting device 100 of FIGS. 1-4. Furthermore, the fluid outlet(s) and/or the cavit(ies) that define the fluid outlet(s) may extend from the interior surface 308 of the housing 102 to the exterior surface 306 of the housing 102 in any direction, orientation and/or configuration.

The spring 104 of the multidirectional vent limiting device 100 of FIGS. 1-4 includes an example first end 334 and an example second end 336 located opposite the first end 334. The first end 334 of the spring 104 contacts and/or abuts the spring seat 328 of the second cavity 314 and/or interior surface 308 of the housing 102. The second end 336 of the spring 104 contacts and/or abuts a first end (described below) of the poppet 106 of the multidirectional vent limiting device 100. As a result of being positioned and/or compressed between the spring seat 328 of the housing 102 and the first end of the poppet 106, the spring 104 of FIGS. 1-4 biases the poppet 106 toward an open position (e.g., toward the fluid inlet 322 and/or the second end 304 of the housing 102) in which fluid is able to flow from the fluid inlet 322, through the first fluid passageway 324, and out of the first fluid outlet 330 and/or the second fluid outlet 332 described above. In the illustrated example of FIGS. 1-4, the spring 104 has a generally cylindrical shape that defines an example central axis 338 of the spring 104. The spring 104 surrounds part of the axial portion of the stem 108. In the illustrated example of FIGS. 1-4, the central axis 338 of the spring 104 is coaxial with the central axis 310 of the housing 102.

The poppet 106 of the multidirectional vent limiting device 100 of FIGS. 1-4 includes an example first end 340 and an example second end 342 located opposite the first end 340. The first end 340 of the poppet 106 contacts and/or abuts the second end 336 of the spring 104 of the multidirectional vent limiting device 100. The second end 342 of the poppet 106 defines and/or includes an example face surface 344 that faces toward the retaining flange of the stem 108 of the multidirectional vent limiting device 100. The second end 342 and/or face surface 344 of the poppet 106 contacts, abuts and/or is adjacent to the retaining flange of the stem 108 when the multidirectional vent limiting device 100 is in an open position, such as the example open position shown in FIG. 3. The second end 342 and/or face surface 344 of the poppet 106 is spaced apart from the retaining flange of the stem 108 when the multidirectional vent limiting device 100 is in a closed position, such as the example closed position shown in FIG. 4.

The poppet 106 of the multidirectional vent limiting device 100 of FIGS. 1-4 also includes an example outer surface 346 (e.g., a peripheral surface) and an example sealing surface 348. The outer surface 346 of the poppet 106 defines a portion of the first fluid passageway 324 described above. In the illustrated example of FIGS. 1-4, the outer surface 346 of the poppet 106 is generally parallel to a spatially-overlapping portion of the first cavity 312 and/or interior surface 308 of the housing 102 that also defines part of the first fluid passageway 324.

The sealing surface 348 of the poppet 106 also defines a portion of the first fluid passageway 324 described above. In the illustrated example of FIGS. 1-4, the sealing surface 348 of the poppet 106 is shaped and/or configured to mate with the complementary-shaped and/or complementary-configured sealing surface 326 of the first cavity 312 and/or interior surface 308 of the housing 102. The sealing surface 348 of the poppet 106 of FIGS. 1-4 accordingly has an angled and/or beveled profile relative to the outer surface 346 of the poppet 106, where the degree of the angle and/or bevel is configured to mate and/or match the degree of the angle and/or bevel of the sealing surface 326 of the first cavity 312 and/or interior surface 308 of the housing 102. In other examples, the sealing surface 348 of the poppet 106 may have a different shape and/or profile (e.g., curved, s-shaped, etc.).

The sealing surface 348 of the poppet 106 is spaced apart from the complementary-shaped and/or complementary-configured sealing surface 326 of the first cavity 312 and/or interior surface 308 of the housing 102 when the multidirectional vent limiting device 100 is in an open position, such as the example open position shown in FIG. 3. When the multidirectional vent limiting device 100 is in the open position shown in FIG. 3, fluid is able to pass through the first fluid passageway 324. In contrast, the sealing surface 348 of the poppet 106 contacts and/or abuts the complementary-shaped and/or complementary-configured sealing surface 326 of the first cavity 312 and/or interior surface 308 of the housing 102 when the multidirectional vent limiting device 100 is in a closed position, such as the example closed position shown in FIG. 4. When the multidirectional vent limiting device 100 is in the closed position shown in FIG. 4, fluid is prevented from passing through the first fluid passageway 324.

The poppet 106 of the multidirectional vent limiting device 100 of FIGS. 1-4 also includes an example central bore 350, and an example radial bore 352 (e.g., a bleed hole). The central bore 350 of the poppet 106 is configured to receive part of the axial portion of the stem 108 of FIGS. 1-4 such that the poppet 106 is slidable and/or movable along and/or relative to the stem 108. The central bore 350 of the poppet 106 defines an example central axis 354 of the poppet 106. In the illustrated example of FIGS. 1-4, the axial portion of the stem 108 extends through the central bore 350 of the poppet 106. The central axis 354 of the poppet 106 is coaxial with the central axis 338 of the spring 104, and further coaxial with the central axis 310 of the housing 102.

The radial bore 352 of the poppet 106 of FIGS. 1-4 is offset radially from the central axis 354 of the poppet 106 of FIGS. 1-4. The radial bore 352 defines a second example fluid passageway 356 (e.g., a secondary fluid passageway). In the illustrated example of FIGS. 1-4, fluid is able to pass through the radial bore 352 and/or the second fluid passageway 356 regardless of whether the multidirectional vent limiting device 100 of FIGS. 1-4 is in an open position or a closed position. Thus, fluid is able to pass through the radial bore 352 and/or the second fluid passageway 356 even when the first fluid passageway 324 is closed off (e.g., when the sealing surface 348 of the poppet 106 is contacting and/or abutting the complementary-shaped and/or complementary-configured sealing surface 326 of the first cavity 312 and/or interior surface 308 of the housing 102). Although the example poppet 106 of FIGS. 1-4 includes a single radial bore 352 defining a single secondary fluid passageway (e.g., second fluid passageway 356), in other examples the poppet 106 of FIGS. 1-4 may include any number of radial bores defining any number of secondary fluid passageways.

The stem 108 of the multidirectional vent limiting device 100 of FIGS. 1-4 includes an example first end 358, an example second end 360 located opposite the first end 358, and an example axial portion 362 located and/or extending between the first end 358 and the second end 360. The first end 358 of the stem 108 includes an example threaded portion 364 shaped and/or configured to be received in a complementary threaded portion of the third cavity 316 of the housing 102 to rigidly couple the stem 108 to the housing 102. The second end 360 of the stem 108 defines and/or includes an example retaining flange 366. The retaining flange 366 of the stem 108 contacts, abuts and/or is adjacent to the second end 342 and/or face surface 344 of the poppet 106 when the multidirectional vent limiting device 100 is in an open position, such as the example open position shown in FIG. 3. The retaining flange 366 of the stem 108 is spaced apart from the second end 342 and/or face surface 344 of the poppet 106 when the multidirectional vent limiting device 100 is in a closed position, such as the example closed position shown in FIG. 4. In some examples, the stem 108 may be implemented as a bolt or screw, where the retaining flange 366 of the stem 108 forms a head of the bolt or screw, and the axial portion 362 of the stem 108 forms a shaft of the bolt or screw.

In the illustrated example of FIGS. 1-4, the axial portion 362 of the stem 108 has a generally cylindrical shape that defines an example central axis 368 of the stem 108. The axial portion 362 of the stem 108 extends through the central bore 350 of the poppet 106 and through the spring 104. The poppet 106 is slidable and/or movable along the axial portion 362 of the stem 108. The retaining flange 366 of the stem 108 forms and/or functions as a first mechanical stop that restricts and/or limits the movement of the poppet 106 in a first direction along the axial portion 362 of the stem 108. The sealing surface 326 of the first cavity 312 and/or interior surface 308 of the housing 102 forms and/or functions as a second mechanical stop that restricts and/or limits the movement of the poppet 106 in a second direction opposite the first direction along the axial portion 362 of the stem 108. In the illustrated example of FIGS. 1-4, the central axis 368 of the stem 108 is coaxial with the central axis 354 of the poppet 106, and further coaxial with the central axis 338 of the spring 104 and the central axis 310 of the housing 102.

In some examples, the multidirectional vent limiting device 100 of FIGS. 1-4 may further include an example pressure transducer 370. The pressure transducer 370 may sense and/or measure a pressure of a fluid that has passed into and/or through the fluid inlet 322 of the housing 102 of the multidirectional vent limiting device 100 (e.g., from an upper casing of a fluid regulator to which the multidirectional vent limiting device 100 is coupled). The pressure transducer 370 may transmit the sensed and/or measured pressure of the fluid to a remote device (e.g., a remotely located control system and/or monitoring device) via a wired and/or wireless communication network.

In some examples, the pressure transducer 370 may be located within the first cavity 312 of the housing 102 of the multidirectional vent limiting device 100. For example, the pressure transducer 370 of FIGS. 1-4 is located and/or mounted on a portion of the interior surface 308 defined by the first cavity 312 of the housing 102. In other examples, the pressure transducer 370 may be located and/or mounted on the face surface 344 of the poppet 106 of the multidirectional vent limiting device 100. In still other examples, the pressure transducer 370 may be located and/or mounted on the retaining flange 366 of the stem 108 of the multidirectional vent limiting device 100.

In some examples, the multidirectional vent limiting device 100 of FIGS. 1-4 may further include an example position transducer 372. The position transducer 372 may sense and/or measure a position of the poppet 106 of the multidirectional vent limiting device 100 relative to the position of the stem 108 (e.g., relative to the position of the retaining flange 366 of the stem 108), and/or relative to the position of the first cavity 312 of the housing 102 of the multidirectional vent limiting device 100. The position transducer 372 may transmit the sensed and/or measured position of the poppet 106 to a remote device (e.g., a remotely located control system and/or monitoring device) via a wired and/or wireless communication network. In some examples, the position transducer 372 may be implemented as a Hall effect sensor. In other examples, the position transducer 372 may alternatively be implemented as any type of proximity and/or motion sensor, detector and/or switch, including both contact and non-contact proximity and/or motion sensors, detectors and/or switches.

In some examples, the position transducer 372 (or a portion thereof) may be located and/or mounted on the face surface 344 of the poppet 106 of the multidirectional vent limiting device 100. In other examples, the position transducer 372 (or a portion thereof) may be located and/or mounted on the outer surface 346 of the poppet 106 of the multidirectional vent limiting device 100. In still other examples, the position transducer 372 (or a portion thereof) may be located and/or formed within the poppet 106 of the multidirectional vent limiting device 100.

In operation, the multidirectional vent limiting device 100 of FIGS. 1-4 is coupled to an upper casing of a fluid regulator. A flow of a fluid from the upper casing of the fluid regulator is received at the fluid inlet 322 of the housing 102 of the multidirectional vent limiting device 100. A force generated by the flowing fluid results in a pressure being applied across the face surface 344 of the poppet 106 of the multidirectional vent limiting device 100.

When the force associated with the pressure applied across the face surface 344 of the poppet 106 does not exceed the biasing force generated by the spring 104 of the multidirectional vent limiting device 100, the sealing surface 348 of the poppet 106 is spaced apart from the sealing surface 326 of the first cavity 312 and/or interior surface 308 of the housing 102. When such spacing and/or separation is present, the multidirectional vent limiting device 100 is in an open position (e.g., the open position shown in FIG. 3), and fluid passes through the first fluid passageway 324 as well as the second fluid passageway 356 described above.

When the force associated with the pressure applied across the face surface 344 of the poppet 106 exceeds the biasing force generated by the spring 104 of the multidirectional vent limiting device 100, the sealing surface 348 of the poppet 106 contacts and/or abuts the sealing surface 326 of the first cavity 312 and/or interior surface 308 of the housing 102. When such contact and/or abutment is present, the multidirectional vent limiting device 100 is in a closed position (e.g., the closed position shown in FIG. 4), and fluid no longer passes through the first fluid passageway 324 (e.g., the first fluid passageway 324 is closed and/or shut off). Instead, the flow of fluid is limited and/or restricted to the second fluid passageway 356 (e.g., through the radial bore 352 of the poppet 106).

Figure 5:
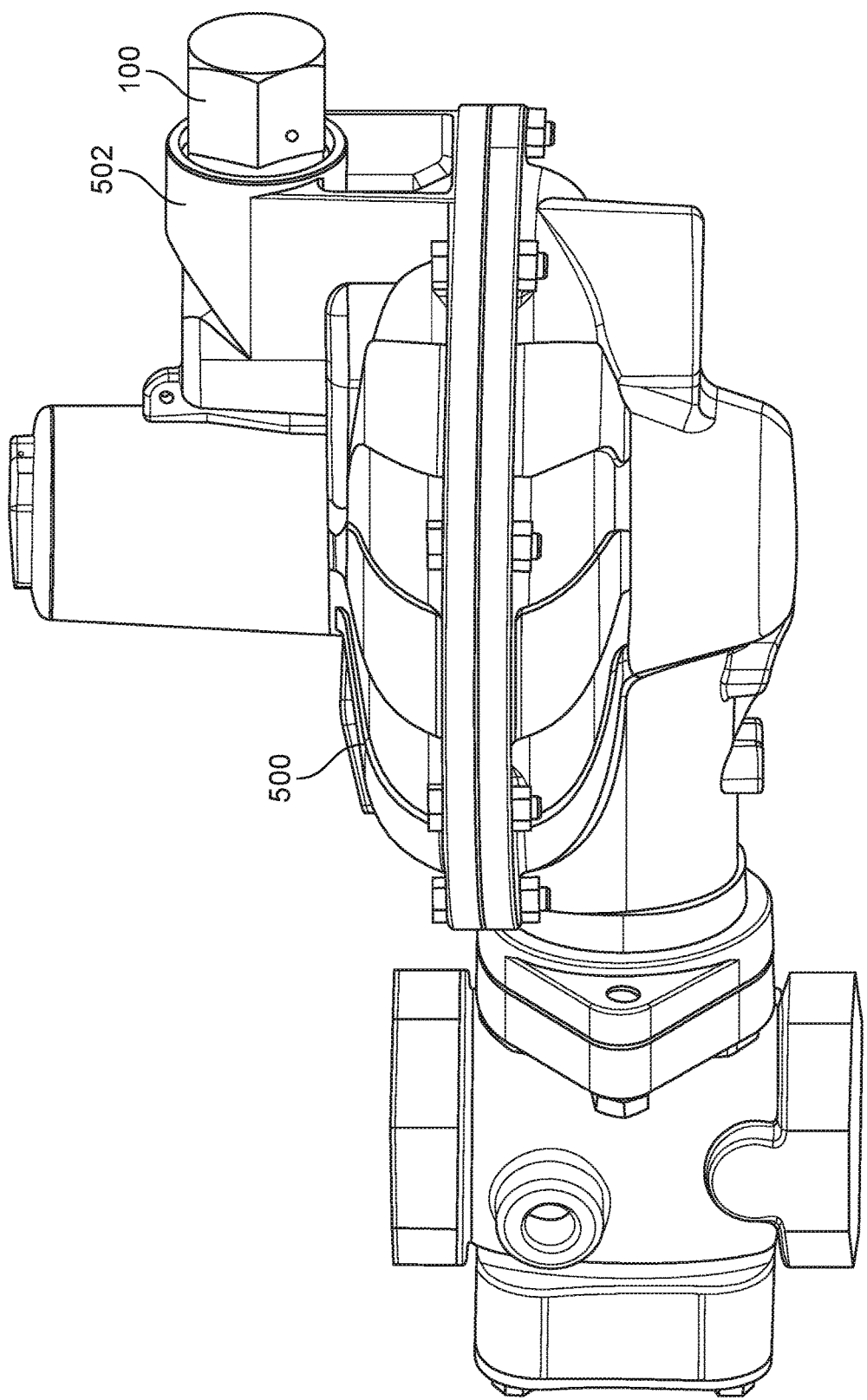
FIG. 5 is a perspective view of the first example multidirectional vent limiting device of FIGS. 1-4 coupled in an example non-vertical orientation to an example fluid regulator.

The operation of the multidirectional vent limiting device 100 of FIGS. 1-4 is not dependent upon the orientation in which the multidirectional vent limiting device 100 is installed and/or coupled to the fluid regulator. The multidirectional vent limiting device 100 is accordingly operable in any orientation, including vertical orientations (e.g., orientations in which the central axis 310 of the housing 102 of the multidirectional vent limiting device 100 is aligned with the downward direction of a gravitational force) as well as horizontal and/or other non-vertical orientations (e.g., orientations in which the central axis 310 of the housing 102 of the multidirectional vent limiting device 100 is not aligned with the downward direction of a gravitational force). FIG. 5 is a perspective view of the multidirectional vent limiting device 100 of FIGS. 1-4 coupled in an example non-vertical orientation to an example fluid regulator 500. In the illustrated example of FIG. 5, the multidirectional vent limiting device 100 is coupled to an example upper casing 502 of the fluid regulator 500.

Figure 6:
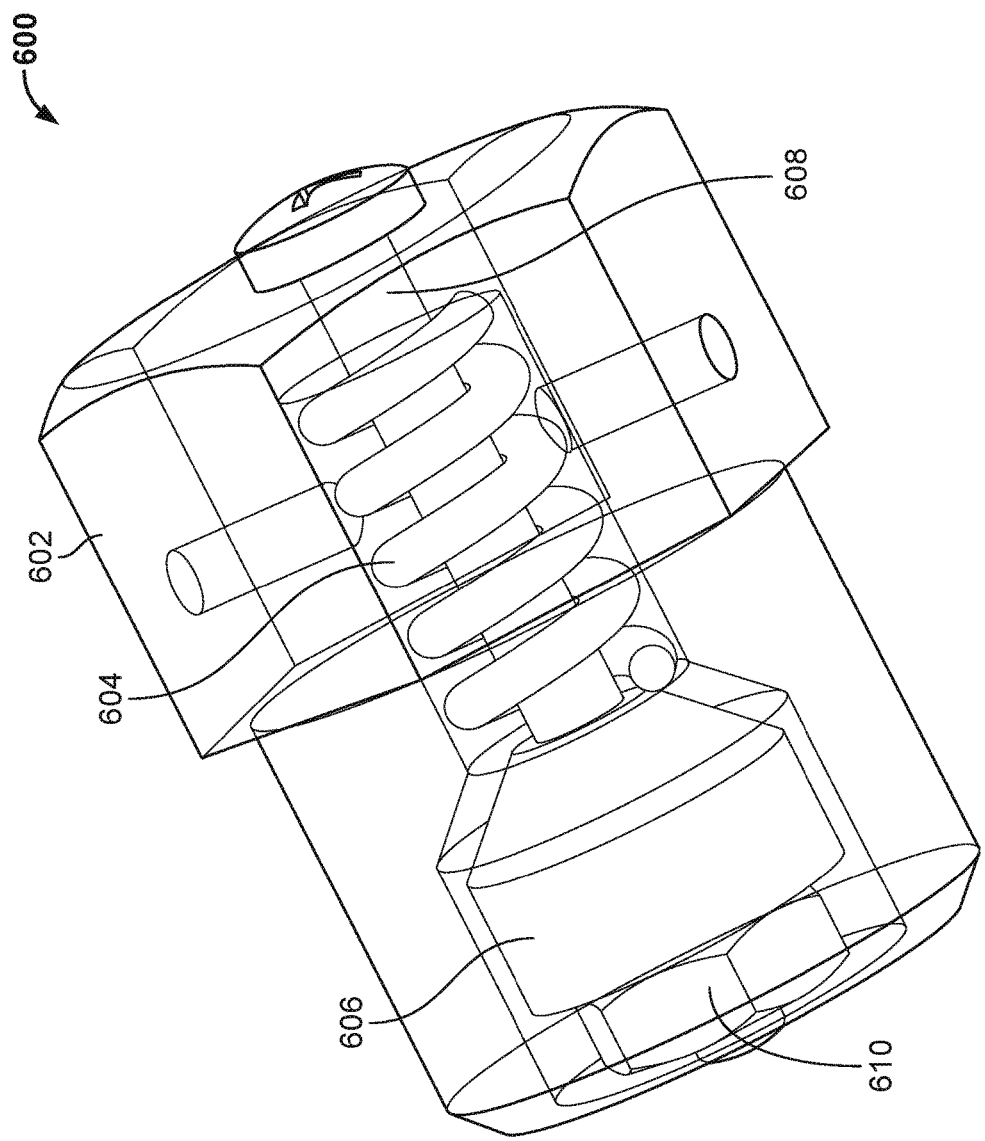
FIG. 6 is a perspective view of a second example multidirectional vent limiting device for use with a fluid regulator.
Figure 7:
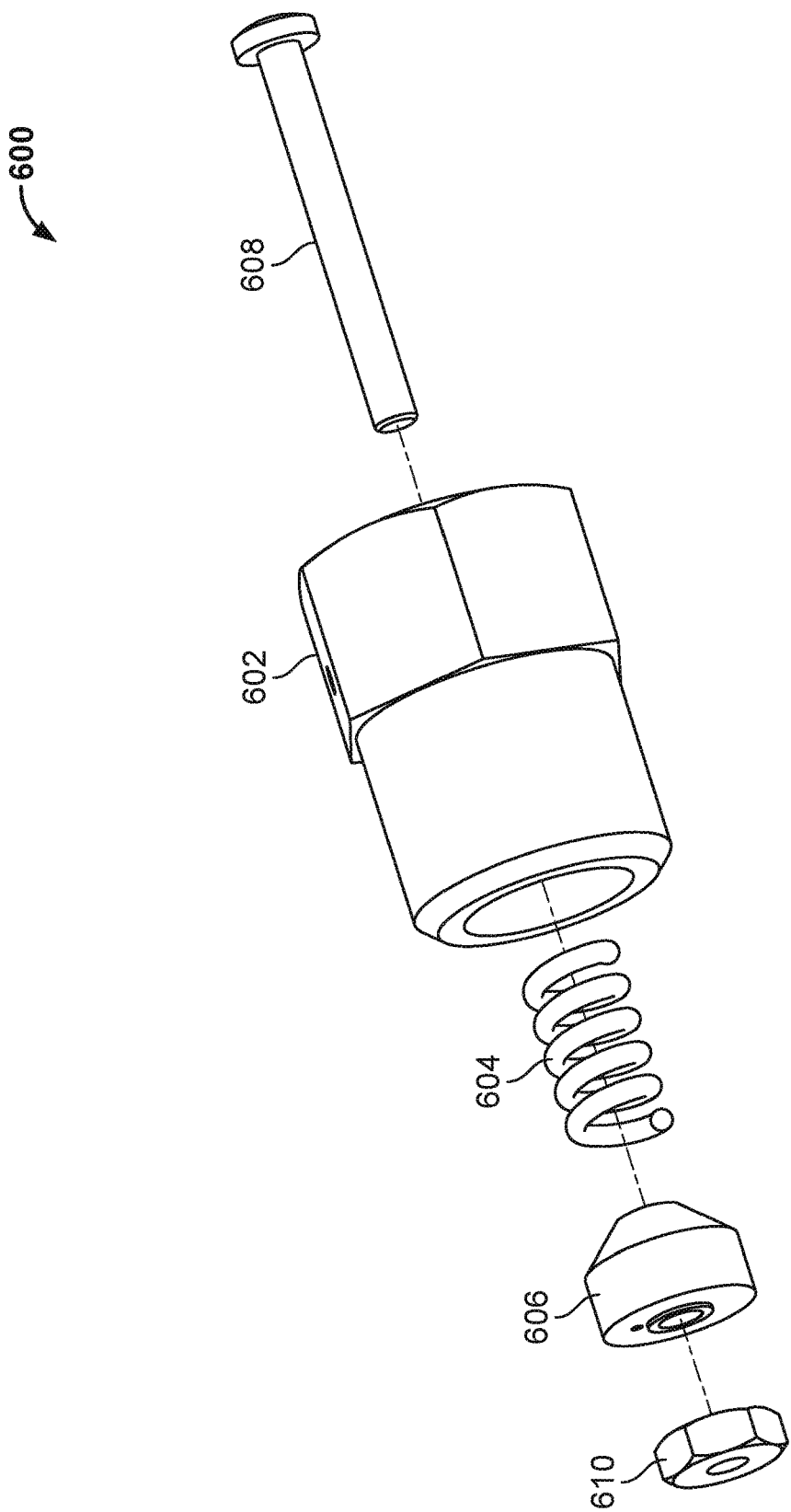
FIG. 7 is an exploded view of the second example multidirectional vent limiting device of FIG. 6.
Figure 8:
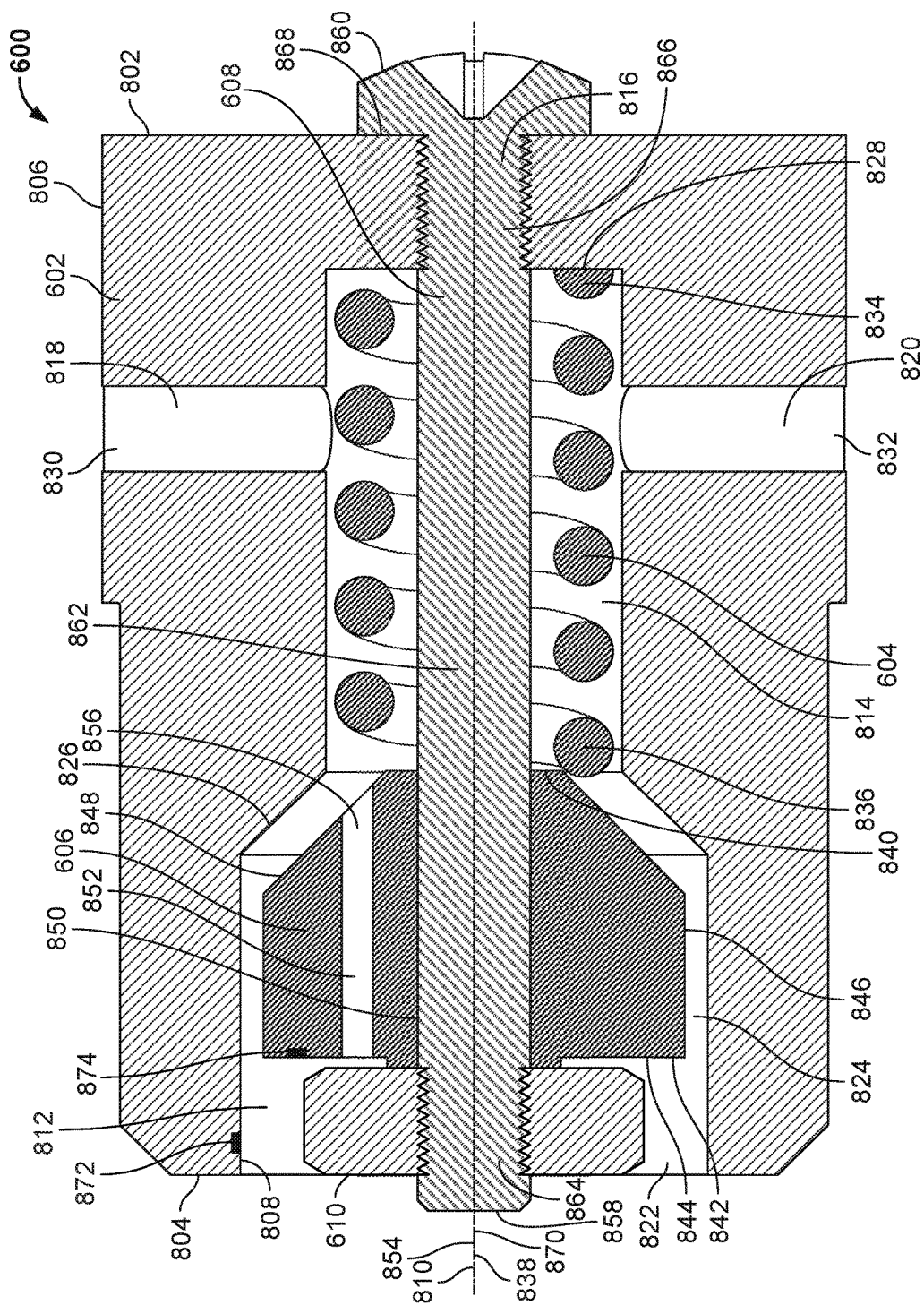
FIG. 8 is a cross-sectional view of the second example multidirectional vent limiting device of FIGS. 6 and 7 in an example open position.
Figure 9:
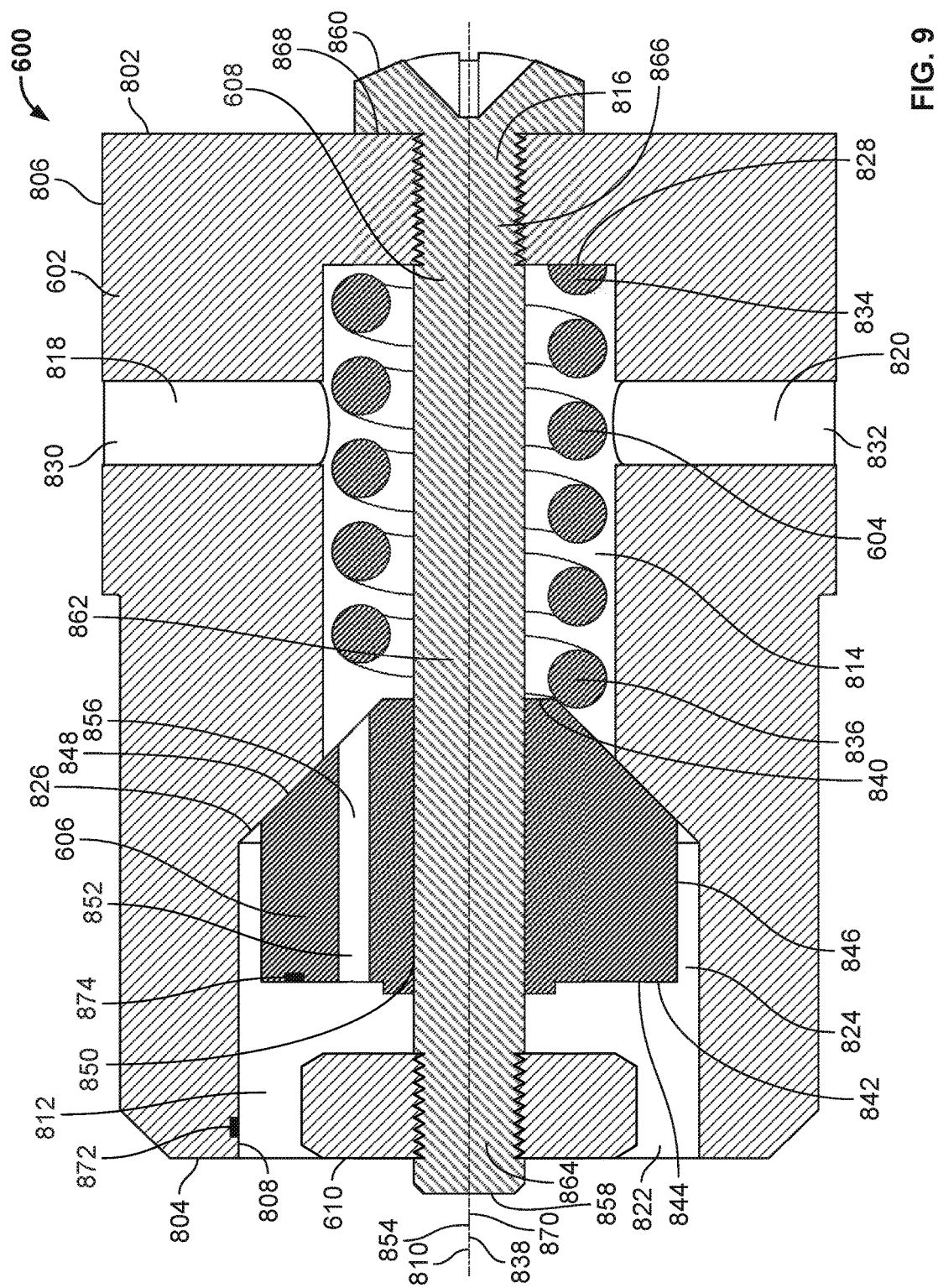
FIG. 9 is a cross-sectional view of the second example multidirectional vent limiting device of FIGS. 6-8 in an example closed position.

FIG. 6 is a perspective view of a second example multidirectional vent limiting device 600 for use with a fluid regulator. FIG. 7 is an exploded view of the second example multidirectional vent limiting device 600 of FIG. 6. FIG. 8 is a cross-sectional view of the second example multidirectional vent limiting device 600 of FIGS. 6 and 7 in an example open position. FIG. 9 is a cross-sectional view of the second example multidirectional vent limiting device 600 of FIGS. 6-8 in an example closed position. The multidirectional vent limiting device 600 of FIGS. 6-9 includes an example housing 602 (shown in phantom in FIG. 6), an example spring 604, an example poppet 606, an example stem 608, and an example retaining nut 610.

The housing 602 of the multidirectional vent limiting device 600 of FIGS. 6-9 includes an example first end 802, an example second end 804 located opposite the first end 802, an example exterior surface 806 (e.g., an exterior and/or peripheral wall), and an example interior surface 808 (e.g., an interior wall). The second end 804 of the housing 602 is shaped and/or configured to be inserted into and/or coupled to a casing of a fluid regulator. The exterior surface 806 and/or the interior surface 808 define(s) an example central axis 810 of the housing 602. In some examples, a portion of the exterior surface 806 proximate the second end 804 of the housing 602 may be threaded to facilitate the formation of a threaded connection between the housing 602 of the multidirectional vent limiting device 600 and a casing of a fluid regulator to which the housing 602 of the multidirectional vent limiting device 600 is to be coupled. In the illustrated example of FIGS. 6-9, the exterior surface 806 of the housing 602 has a generally cylindrical shape. In other examples, the exterior surface 806 of the housing 602 may be of a different shape (e.g., cubic, prismatic, conical, pyramidal, spherical, etc.).

The housing 602 of the multidirectional vent limiting device 600 of FIGS. 6-9 further includes a first example cavity 812, a second example cavity 814, a third example cavity 816, a fourth example cavity 818, and a fifth example cavity 820. In the illustrated example of FIGS. 6-9, the first cavity 812, second cavity 814, third cavity 816, fourth cavity 818, and fifth cavity 820 of the housing 602 define, and/or are defined by, the interior surface 808 of the housing 602. In some examples, the housing 602 may include additional and/or fewer cavities relative to the number of cavities shown and described in connection with the housing 602 of the multidirectional vent limiting device 600 of FIGS. 6-9.

In the illustrated example of FIGS. 6-9, the first cavity 812 of the housing 602 is shaped and/or configured to receive and/or house the poppet 606 of the multidirectional vent limiting device 600. The first cavity 812 of the housing 602 is also shaped and/or configured to receive and/or house the retaining nut 610 and part of an axial portion (described below) of the stem 608 of the multidirectional vent limiting device 600. The first cavity 812 of the housing 602 defines and/or includes an example fluid inlet 822 of the multidirectional vent limiting device 600 located proximate the second end 804 of the housing 602. The first cavity 812 of the housing 602 also defines and/or includes a first example fluid passageway 824 (e.g., a primary fluid passageway) located between an outer surface (described below) of the poppet 606 of the multidirectional vent limiting device 600 and the interior surface 808 of the housing 602 of the multidirectional vent limiting device 600.

The first cavity 812 of the housing 602 of FIGS. 6-9 also defines and/or includes an example sealing surface 826. The sealing surface 826 of the first cavity 812 is shaped and/or configured to mate with a complementary-shaped and/or complementary-configured sealing surface (described below) of the poppet 606 to close off the first fluid passageway 824 when the multidirectional vent limiting device 600 is in a closed position, such as the example closed position shown in FIG. 9. In the illustrated example of FIGS. 6-9, the sealing surface 826 of the first cavity 812 has an angled and/or beveled profile relative to the remainder of the first cavity 812. In other examples, the sealing surface 826 may have a different shape and/or profile (e.g., curved, s-shaped, etc.).

The second cavity 814 of the housing 602 of FIGS. 6-9 is shaped and/or configured to receive and/or house the spring 604 and part of the axial portion of the stem 608 of the multidirectional vent limiting device 600. The second cavity 814 of the housing 602 is in fluid communication with the first cavity 812 of the housing 602. The second cavity 814 of the housing 602 defines and/or includes an example spring seat 828 to support a first end (described below) of the spring 604 of the multidirectional vent limiting device 600 of FIGS. 6-9.

The third cavity 816 of the housing 602 of FIGS. 6-9 is shaped and/or configured to receive part of the axial portion of the stem 608 of the multidirectional vent limiting device 600. In the illustrated example of FIGS. 6-9, the stem 608 is rigidly coupled to the housing 602 via a threaded connection formed by and/or between a threaded portion (described below) of the stem 608 and complementary threading located and/or formed within the third cavity 816 of the housing 602.

In the illustrated example of FIGS. 6-9, the fourth cavity 818 and the fifth cavity 820 of the housing 602 are respectively in fluid communication with the second cavity 814 of the housing 602. The fourth cavity 818 of the housing 602 extends from the second cavity 814 of the housing 602 to the exterior surface 806 of the housing 602. The fourth cavity 818 of the housing 602 defines and/or includes a first example fluid outlet 830 of the multidirectional vent limiting device 600. The fifth cavity 820 of the housing 602 also extends from the second cavity 814 of the housing 602 to the exterior surface 806 of the housing 602. The fifth cavity 820 of the housing 602 defines and/or includes a second example fluid outlet 832 of the multidirectional vent limiting device 600.

In the illustrated example of FIGS. 6-9, the fourth cavity 818 and/or the first fluid outlet 830 extend(s) radially from the central axis 810 of the housing 602 in a first direction that is opposite to a second direction in which the fifth cavity 820 and/or the second fluid outlet 832 extend(s) radially from the central axis 810 of the housing 602. In other examples, the housing 602 may include additional and/or fewer fluid outlets relative to the number of fluid outlets shown and described in connection with the multidirectional vent limiting device 600 of FIGS. 6-9. Furthermore, the fluid outlet(s) and/or the cavit(ies) that define the fluid outlet(s) may extend from the interior surface 808 of the housing 602 to the exterior surface 806 of the housing 602 in any direction, orientation and/or configuration.

The spring 604 of the multidirectional vent limiting device 600 of FIGS. 6-9 includes an example first end 834 and an example second end 836 located opposite the first end 834. The first end 834 of the spring 604 contacts and/or abuts the spring seat 828 of the second cavity 814 and/or interior surface 808 of the housing 602. The second end 836 of the spring 604 contacts and/or abuts a first end (described below) of the poppet 606 of the multidirectional vent limiting device 600. As a result of being positioned and/or compressed between the spring seat 828 of the housing 602 and the first end of the poppet 606, the spring 604 of FIGS. 6-9 biases the poppet 606 toward an open position (e.g., toward the fluid inlet 822 and/or the second end 804 of the housing 602) in which fluid is able to flow from the fluid inlet 822, through the first fluid passageway 824, and out of the first fluid outlet 830 and/or the second fluid outlet 832 described above. In the illustrated example of FIGS. 6-9, the spring 604 has a generally cylindrical shape that defines an example central axis 838 of the spring 604. The spring 604 surrounds part of the axial portion of the stem 608. In the illustrated example of FIGS. 6-9, the central axis 838 of the spring 604 is coaxial with the central axis 810 of the housing 602.

The poppet 606 of the multidirectional vent limiting device 600 of FIGS. 6-9 includes an example first end 840 and an example second end 842 located opposite the first end 840. The first end 840 of the poppet 606 contacts and/or abuts the second end 836 of the spring 604 of the multidirectional vent limiting device 600. The second end 842 of the poppet 606 defines and/or includes an example face surface 844 that faces toward the retaining nut 610 of the multidirectional vent limiting device 600. The second end 842 and/or face surface 844 of the poppet 606 contacts, abuts and/or is adjacent to the retaining nut 610 when the multidirectional vent limiting device 600 is in an open position, such as the example open position shown in FIG. 8. The second end 842 and/or face surface 844 of the poppet 606 is spaced apart from the retaining nut 610 when the multidirectional vent limiting device 600 is in a closed position, such as the example closed position shown in FIG. 9.

The poppet 606 of the multidirectional vent limiting device 600 of FIGS. 6-9 also includes an example outer surface 846 (e.g., a peripheral surface) and an example sealing surface 848. The outer surface 846 of the poppet 606 defines a portion of the first fluid passageway 824 described above. In the illustrated example of FIGS. 6-9, the outer surface 846 of the poppet 606 is generally parallel to a spatially-overlapping portion of the first cavity 812 and/or interior surface 808 of the housing 602 that also defines part of the first fluid passageway 824.

The sealing surface 848 of the poppet 606 also defines a portion of the first fluid passageway 824 described above. In the illustrated example of FIGS. 6-9, the sealing surface 848 of the poppet 606 is shaped and/or configured to mate with the complementary-shaped and/or complementary-configured sealing surface 826 of the first cavity 812 and/or interior surface 808 of the housing 602. The sealing surface 848 of the poppet 606 of FIGS. 6-9 accordingly has an angled and/or beveled profile relative to the outer surface 846 of the poppet 606, where the degree of the angle and/or bevel is configured to mate and/or match the degree of the angle and/or bevel of the sealing surface 826 of the first cavity 812 and/or interior surface 808 of the housing 602. In other examples, the sealing surface 848 of the poppet 606 may have a different shape and/or profile (e.g., curved, s-shaped, etc.).

The sealing surface 848 of the poppet 606 is spaced apart from the complementary-shaped and/or complementary-configured sealing surface 826 of the first cavity 812 and/or interior surface 808 of the housing 602 when the multidirectional vent limiting device 600 is in an open position, such as the example open position shown in FIG. 8. When the multidirectional vent limiting device 600 is in the open position shown in FIG. 8, fluid is able to pass through the first fluid passageway 824. In contrast, the sealing surface 848 of the poppet 606 contacts and/or abuts the complementary-shaped and/or complementary-configured sealing surface 826 of the first cavity 812 and/or interior surface 808 of the housing 602 when the multidirectional vent limiting device 600 is in a closed position, such as the example closed position shown in FIG. 9. When the multidirectional vent limiting device 600 is in the closed position shown in FIG. 9, fluid is prevented from passing through the first fluid passageway 824.

The poppet 606 of the multidirectional vent limiting device 600 of FIGS. 6-9 also includes an example central bore 850, and an example radial bore 852 (e.g., a bleed hole). The central bore 850 of the poppet 606 is configured to receive part of the axial portion of the stem 608 of FIGS. 6-9 such that the poppet 606 is slidable and/or movable along and/or relative to the stem 608. The central bore 850 of the poppet 606 defines an example central axis 854 of the poppet 606. In the illustrated example of FIGS. 6-9, the axial portion of the stem 608 extends through the central bore 850 of the poppet 606. The central axis 854 of the poppet 606 is coaxial with the central axis 838 of the spring 604, and further coaxial with the central axis 810 of the housing 602.

The radial bore 852 of the poppet 606 of FIGS. 6-9 is offset radially from the central axis 854 of the poppet 606 of FIGS. 6-9. The radial bore 852 defines a second example fluid passageway 856 (e.g., a secondary fluid passageway). In the illustrated example of FIGS. 6-9, fluid is able to pass through the radial bore 852 and/or the second fluid passageway 856 regardless of whether the multidirectional vent limiting device 600 of FIGS. 6-9 is in an open position or a closed position. Thus, fluid is able to pass through the radial bore 852 and/or the second fluid passageway 856 even when the first fluid passageway 824 is closed off (e.g., when the sealing surface 848 of the poppet 606 is contacting and/or abutting the complementary-shaped and/or complementary-configured sealing surface 826 of the first cavity 812 and/or interior surface 808 of the housing 602). Although the example poppet 606 of FIGS. 6-9 includes a single radial bore 852 defining a single secondary fluid passageway (e.g., second fluid passageway 856), in other examples the poppet 606 of FIGS. 6-9 may include any number of radial bores defining any number of secondary fluid passageways.

The stem 608 of the multidirectional vent limiting device 600 of FIGS. 6-9 includes an example first end 858, an example second end 860 located opposite the first end 858, and an example axial portion 862 located and/or extending between the first end 858 and the second end 860. The first end 858 of the stem 608 includes a first example threaded portion 864 shaped and/or configured to be received in a complementary threaded portion of the retaining nut 610 of the multidirectional vent limiting device 600. The retaining nut 610 contacts, abuts and/or is adjacent to the second end 842 and/or face surface 844 of the poppet 606 when the multidirectional vent limiting device 600 is in an open position, such as the example open position shown in FIG. 8. The retaining nut 610 is spaced apart from the second end 842 and/or face surface 844 of the poppet 606 when the multidirectional vent limiting device 600 is in a closed position, such as the example closed position shown in FIG. 9. The second end 860 of the stem 608 includes a second example threaded portion 866 shaped and/or configured to be received in a complementary threaded portion of the third cavity 816 of the housing 602 to rigidly couple the stem 608 to the housing 602. The second end 860 of the stem 608 also includes an example retaining flange 868. The retaining flange 868 of the stem 608 contacts, abuts and/or is adjacent to the first end 802 of the housing 602 of the multidirectional vent limiting device 600. In some examples, the stem 608 may be implemented as a bolt or screw, where the retaining flange 868 of the stem 608 forms a head of the bolt or screw, and the axial portion 862 of the stem 608 forms a shaft of the bolt or screw.

In the illustrated example of FIGS. 6-9, the axial portion 862 of the stem 608 has a generally cylindrical shape that defines an example central axis 870 of the stem 608. The axial portion 862 of the stem 608 extends through the central bore 850 of the poppet 606 and through the spring 604. The poppet 606 is slidable and/or movable along the axial portion 862 of the stem 608. The retaining nut 610 of FIGS. 6-9 forms and/or functions as a first mechanical stop that restricts and/or limits the movement of the poppet 606 in a first direction along the axial portion 862 of the stem 608. The sealing surface 826 of the first cavity 812 and/or interior surface 808 of the housing 602 forms and/or functions as a second mechanical stop that restricts and/or limits the movement of the poppet 606 in a second direction opposite the first direction along the axial portion 862 of the stem 608. In the illustrated example of FIGS. 6-9, the central axis 870 of the stem 608 is coaxial with the central axis 854 of the poppet 606, and further coaxial with the central axis 838 of the spring 604 and the central axis 810 of the housing 602.

In some examples, the multidirectional vent limiting device 600 of FIGS. 6-9 may further include an example pressure transducer 872. The pressure transducer 872 may sense and/or measure a pressure of a fluid that has passed into and/or through the fluid inlet 822 of the housing 602 of the multidirectional vent limiting device 600 (e.g., from an upper casing of a fluid regulator to which the multidirectional vent limiting device 600 is coupled). The pressure transducer 872 may transmit the sensed and/or measured pressure of the fluid to a remote device (e.g., a remotely located control system and/or monitoring device) via a wired and/or wireless communication network.

In some examples, the pressure transducer 872 may be located within the first cavity 812 of the housing 602 of the multidirectional vent limiting device 600. For example, the pressure transducer 872 of FIGS. 6-9 is located and/or mounted on a portion of the interior surface 808 defined by the first cavity 812 of the housing 602. In other examples, the pressure transducer 872 may be located and/or mounted on the face surface 844 of the poppet 606 of the multidirectional vent limiting device 600. In still other examples, the pressure transducer 872 may be located and/or mounted on the first end 858 of the stem 608 of the multidirectional vent limiting device 600. In still other examples, the pressure transducer 872 may be located and/or mounted on the retaining nut 610 of the multidirectional vent limiting device 600.

In some examples, the multidirectional vent limiting device 600 of FIGS. 6-9 may further include an example position transducer 874. The position transducer 874 may sense and/or measure a position of the poppet 606 of the multidirectional vent limiting device 600 relative to the position of the stem 608 (e.g., relative to the position of the first end 858 of the stem 608), relative to the position of the retaining nut 610, and/or relative to the position of the first cavity 812 of the housing 602 of the multidirectional vent limiting device 600. The position transducer 874 may transmit the sensed and/or measured position of the poppet 606 to a remote device (e.g., a remotely located control system and/or monitoring device) via a wired and/or wireless communication network. In some examples, the position transducer 874 may be implemented as a Hall effect sensor. In other examples, the position transducer 874 may be implemented as any type of proximity and/or motion sensor, detector and/or switch, including both contact and non-contact proximity and/or motion sensors, detectors and/or switches.

In some examples, the position transducer 874 (or a portion thereof) may be located and/or mounted on the face surface 844 of the poppet 606 of the multidirectional vent limiting device 600. In other examples, the position transducer 874 (or a portion thereof) may be located and/or mounted on the outer surface 846 of the poppet 606 of the multidirectional vent limiting device 600. In still other examples, the position transducer 874 (or a portion thereof) may be located and/or formed within the poppet 606 of the multidirectional vent limiting device 600.

In operation, the multidirectional vent limiting device 600 of FIGS. 6-9 is coupled to an upper casing of a fluid regulator. A flow of a fluid from the upper casing of the fluid regulator is received at the fluid inlet 822 of the housing 602 of the multidirectional vent limiting device 600. A force generated by the flowing fluid results in a pressure being applied across the face surface 844 of the poppet 606 of the multidirectional vent limiting device 600.

When the force associated with the pressure applied across the face surface 844 of the poppet 606 does not exceed the biasing force generated by the spring 604 of the multidirectional vent limiting device 600, the sealing surface 848 of the poppet 606 is spaced apart from the sealing surface 826 of the first cavity 812 and/or interior surface 808 of the housing 602. When such spacing and/or separation is present, the multidirectional vent limiting device 600 is in an open position (e.g., the open position shown in FIG. 8), and fluid passes through the first fluid passageway 824 as well as the second fluid passageway 856 described above.

When the force associated with the pressure applied across the face surface 844 of the poppet 606 exceeds the biasing force generated by the spring 604 of the multidirectional vent limiting device 600, the sealing surface 848 of the poppet 606 contacts and/or abuts the sealing surface 826 of the first cavity 812 and/or interior surface 808 of the housing 602. When such contact and/or abutment is present, the multidirectional vent limiting device 600 is in a closed position (e.g., the closed position shown in FIG. 9), and fluid no longer passes through the first fluid passageway 824 (e.g., the first fluid passageway 824 is closed and/or shut off). Instead, the flow of fluid is limited and/or restricted to the second fluid passageway 856 (e.g., through the radial bore 852 of the poppet 606).

Figure 10:
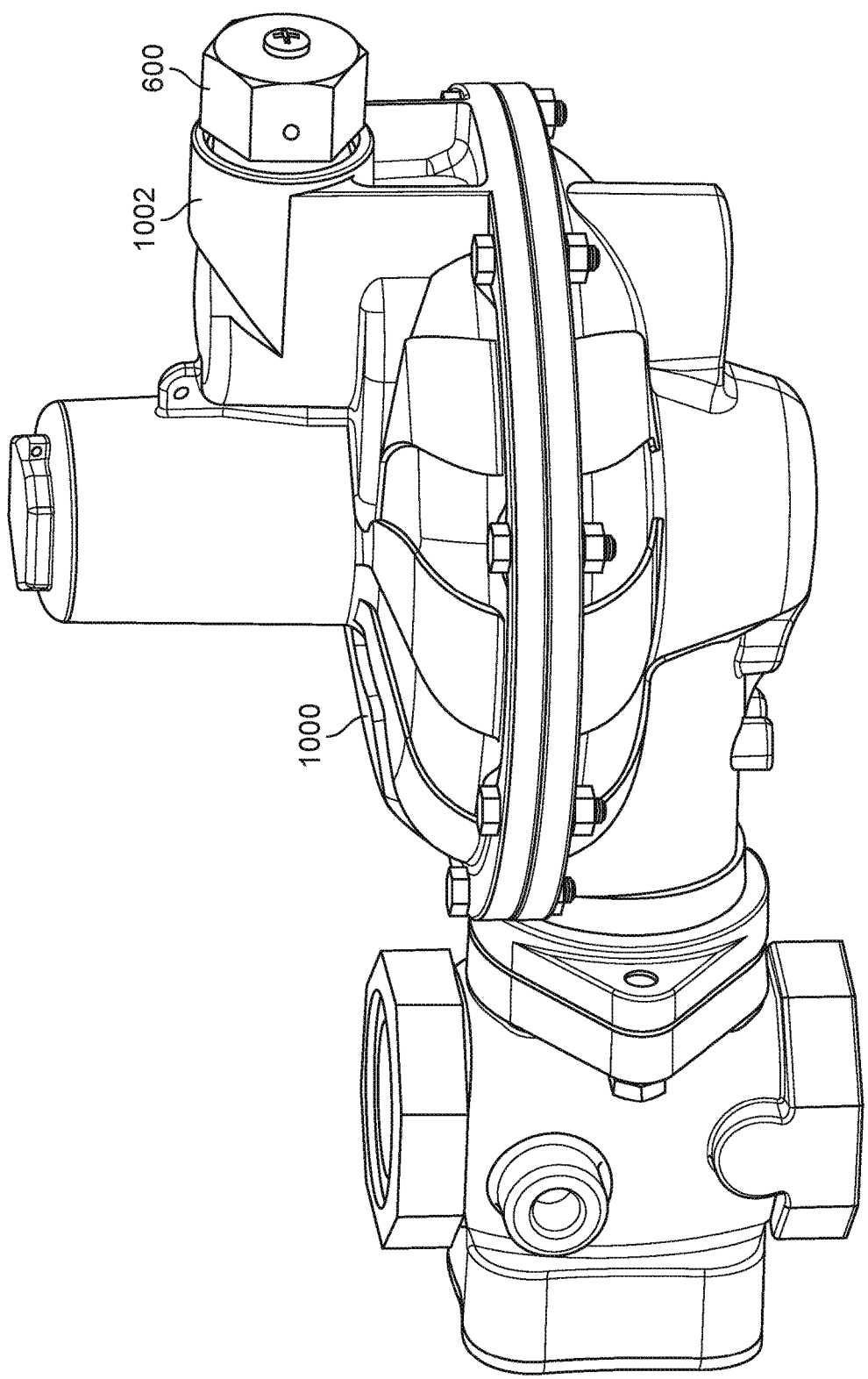
FIG. 10 is a perspective view of the second example multidirectional vent limiting device of FIGS. 6-9 coupled in an example non-vertical orientation to an example fluid regulator.

The operation of the multidirectional vent limiting device 600 of FIGS. 6-9 is not dependent upon the orientation in which the multidirectional vent limiting device 600 is installed and/or coupled to the fluid regulator. The multidirectional vent limiting device 600 is accordingly operable in any orientation, including vertical orientations (e.g., orientations in which the central axis 810 of the housing 602 of the multidirectional vent limiting device 600 is aligned with the downward direction of a gravitational force) as well as horizontal and/or other non-vertical orientations (e.g., orientations in which the central axis 810 of the housing 602 of the multidirectional vent limiting device 600 is not aligned with the downward direction of a gravitational force). FIG. 10 is a perspective view of the multidirectional vent limiting device 600 of FIGS. 6-9 coupled in an example non-vertical orientation to an example fluid regulator 1000. In the illustrated example of FIG. 10, the multidirectional vent limiting device 600 is coupled to an example upper casing 1002 of the fluid regulator 1000.

Figure 11:
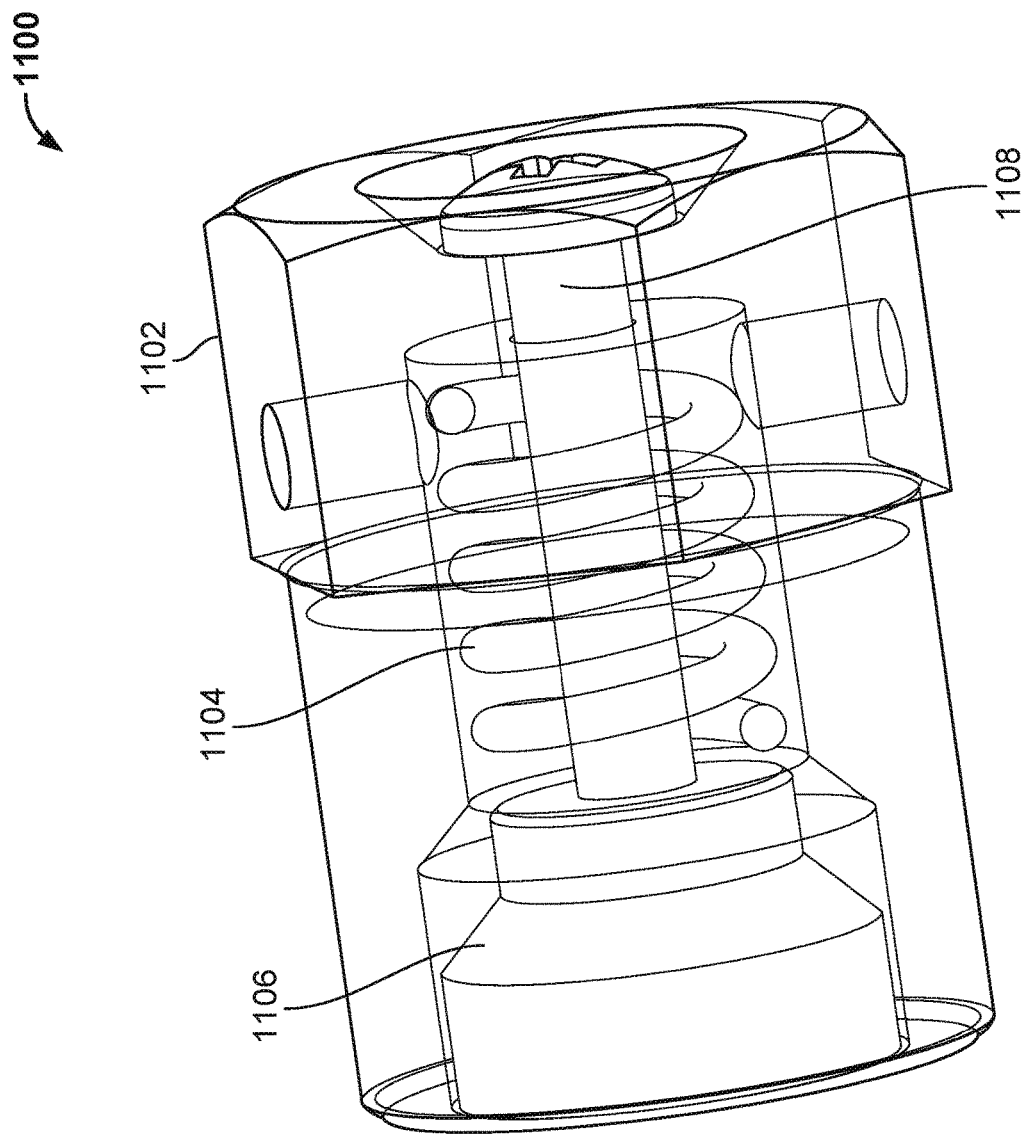
FIG. 11 is a perspective view of a third example multidirectional vent limiting device for use with a fluid regulator.
Figure 12:
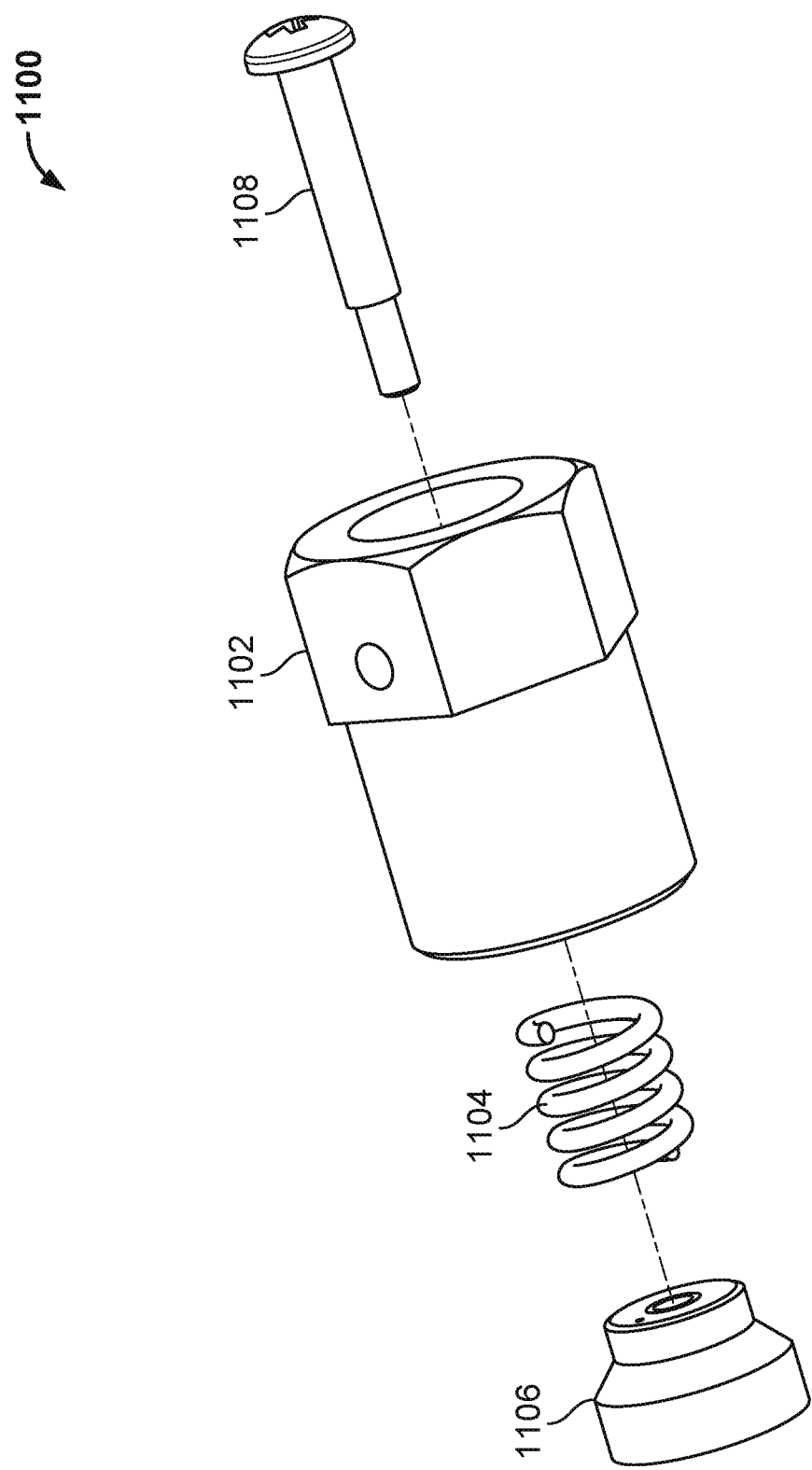
FIG. 12 is an exploded view of the third example multidirectional vent limiting device of FIG. 11.
Figure 13:
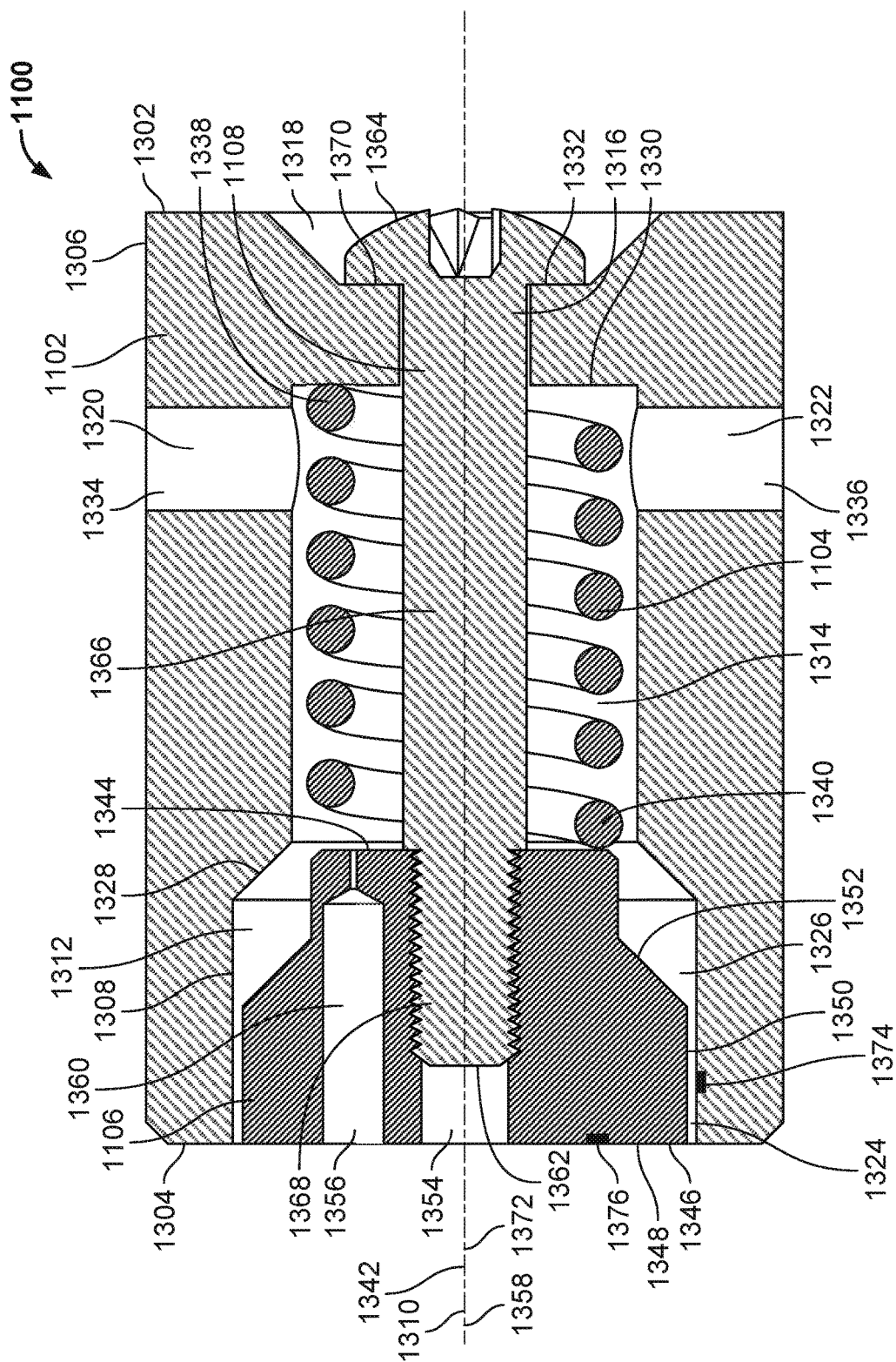
FIG. 13 is a cross-sectional view of the third example multidirectional vent limiting device of FIGS. 11 and 12 in an example open position.
Figure 14:
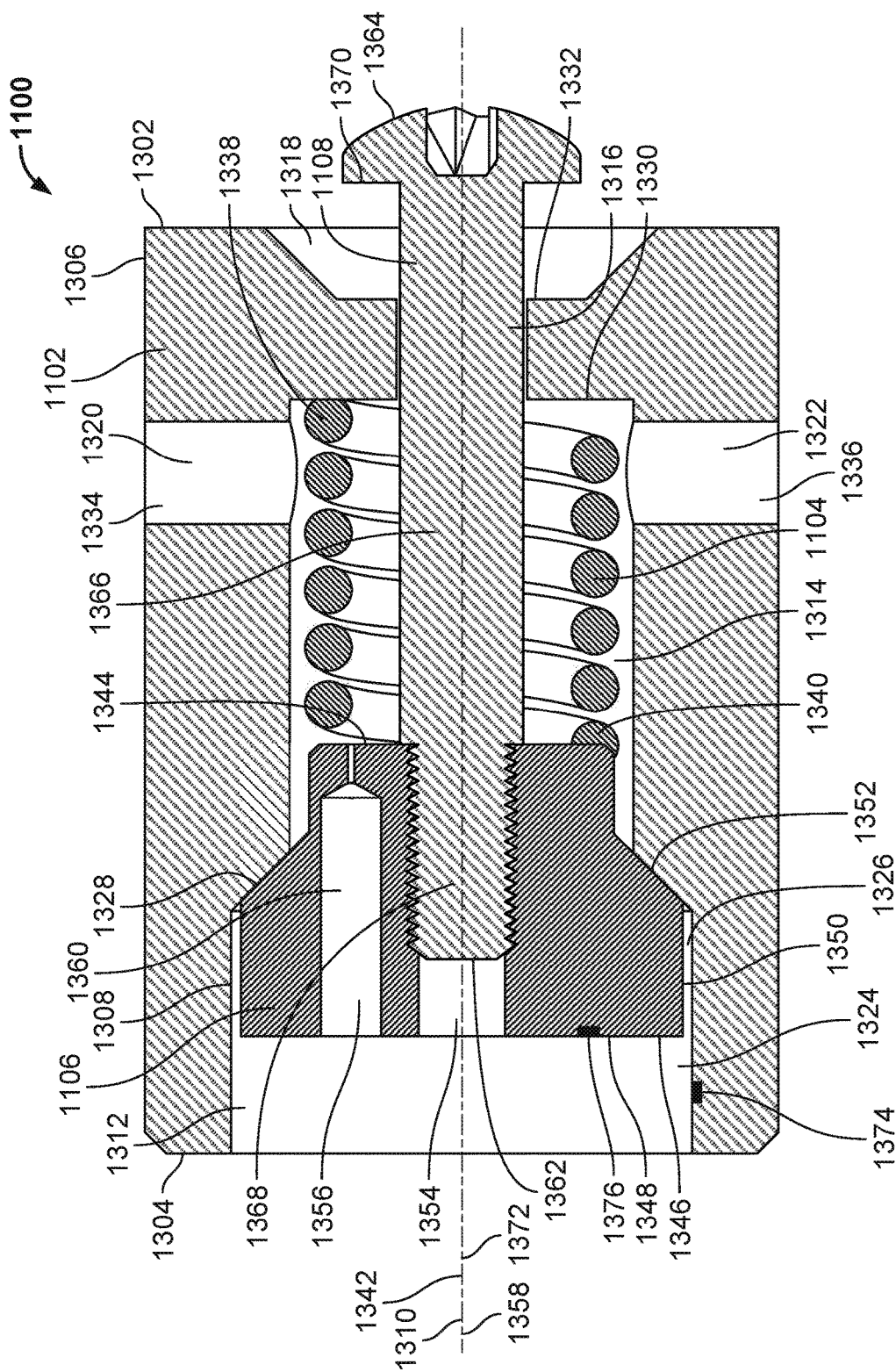
FIG. 14 is a cross-sectional view of the third example multidirectional vent limiting device of FIGS. 11-13 in an example closed position.

FIG. 11 is a perspective view of a third example multidirectional vent limiting device 1100 for use with a fluid regulator. FIG. 12 is an exploded view of the third example multidirectional vent limiting device 1100 of FIG. 11. FIG. 13 is a cross-sectional view of the third example multidirectional vent limiting device 1100 of FIGS. 11 and 12 in an example open position. FIG. 14 is a cross-sectional view of the third example multidirectional vent limiting device 1100 of FIGS. 11-13 in an example closed position. The multidirectional vent limiting device 1100 of FIGS. 11-14 includes an example housing 1102 (shown in phantom in FIG. 11), an example spring 1104, an example poppet 1106, and an example stem 1108.

The housing 1102 of the multidirectional vent limiting device 1100 of FIGS. 11-14 includes an example first end 1302, an example second end 1304 located opposite the first end 1302, an example exterior surface 1306 (e.g., an exterior and/or peripheral wall), and an example interior surface 1308 (e.g., an interior wall). The second end 1304 of the housing 1102 is shaped and/or configured to be inserted into and/or coupled to a casing of a fluid regulator. The exterior surface 1306 and/or the interior surface 1308 define(s) an example central axis 1310 of the housing 1102. In some examples, a portion of the exterior surface 1306 proximate the second end 1304 of the housing 1102 may be threaded to facilitate the formation of a threaded connection between the housing 1102 of the multidirectional vent limiting device 1100 and a casing of a fluid regulator to which the housing 1102 of the multidirectional vent limiting device 1100 is to be coupled. In the illustrated example of FIGS. 11-14, the exterior surface 1306 of the housing 1102 has a generally cylindrical shape. In other examples, the exterior surface 1306 of the housing 1102 may be of a different shape (e.g., cubic, prismatic, conical, pyramidal, spherical, etc.).

The housing 1102 of the multidirectional vent limiting device 1100 of FIGS. 11-14 further includes a first example cavity 1312, a second example cavity 1314, a third example cavity 1316, a fourth example cavity 1318, a fifth example cavity 1320, and a sixth example cavity 1322. In the illustrated example of FIGS. 11-14, the first cavity 1312, second cavity 1314, third cavity 1316, fourth cavity 1318, fifth cavity 1320, and sixth cavity 1322 of the housing 1102 define, and/or are defined by, the interior surface 1308 of the housing 1102. In some examples, the housing 1102 may include additional and/or fewer cavities relative to the number of cavities shown and described in connection with the housing 1102 of the multidirectional vent limiting device 1100 of FIGS. 11-14.

In the illustrated example of FIGS. 11-14, the first cavity 1312 of the housing 1102 is shaped and/or configured to receive and/or house the poppet 1106 of the multidirectional vent limiting device 1100. The first cavity 1312 of the housing 1102 is also shaped and/or configured to receive and/or house part of an axial portion (described below) of the stem 1108 of the multidirectional vent limiting device 1100. The first cavity 1312 of the housing 1102 defines and/or includes an example fluid inlet 1324 of the multidirectional vent limiting device 1100 located proximate the second end 1304 of the housing 1102. The first cavity 1312 of the housing 1102 also defines and/or includes a first example fluid passageway 1326 (e.g., a primary fluid passageway) located between an outer surface (described below) of the poppet 1106 of the multidirectional vent limiting device 1100 and the interior surface 1308 of the housing 1102 of the multidirectional vent limiting device 1100.

The first cavity 1312 of the housing 1102 of FIGS. 11-14 also defines and/or includes an example sealing surface 1328. The sealing surface 1328 of the first cavity 1312 is shaped and/or configured to mate with a complementary-shaped and/or complementary-configured sealing surface (described below) of the poppet 1106 to close off the first fluid passageway 1326 when the multidirectional vent limiting device 1100 is in a closed position, such as the example closed position shown in FIG. 14. In the illustrated example of FIGS. 11-14, the sealing surface 1328 of the first cavity 1312 has an angled and/or beveled profile relative to the remainder of the first cavity 1312. In other examples, the sealing surface 1328 may have a different shape and/or profile (e.g., curved, s-shaped, etc.).

The second cavity 1314 of the housing 1102 of FIGS. 11-14 is shaped and/or configured to receive and/or house the spring 1104 and part of the axial portion of the stem 1108 of the multidirectional vent limiting device 1100. The second cavity 1314 of the housing 1102 is in fluid communication with the first cavity 1312 of the housing 1102. The second cavity 1314 of the housing 1102 defines and/or includes an example spring seat 1330 to support a first end (described below) of the spring 1104 of the multidirectional vent limiting device 1100 of FIGS. 11-14.

The third cavity 1316 of the housing 1102 of FIGS. 11-14 is shaped and/or configured to receive part of the axial portion of the stem 1108 of the multidirectional vent limiting device 1100. The fourth cavity 1318 of the housing 1102 of FIGS. 11-14 is shaped and/or configured to receive a retaining flange (described below) of the stem 1108 of the multidirectional vent limiting device 1100. The fourth cavity 1318 of the housing 1102 defines and/or includes an example retaining flange seat 1332. The retaining flange seat 1332 forms and/or functions as a first mechanical stop that restricts and/or limits the movement of the stem 1108 and/or the poppet 1106 in a first direction (e.g., toward the fluid inlet 1324 of the housing 1102). The retaining flange of the stem 1108 contacts, abuts and/or is adjacent to the retaining flange seat 1332 when the multidirectional vent limiting device 1100 is in an open position, such as the example open position shown in FIG. 13. The retaining flange of the stem 1108 is spaced apart from the retaining flange seat 1332 when the multidirectional vent limiting device 1100 is in a closed position, such as the example closed position shown in FIG. 14.

In the illustrated example of FIGS. 11-14, the fifth cavity 1320 and the sixth cavity 1322 of the housing 1102 are respectively in fluid communication with the second cavity 1314 of the housing 1102. The fifth cavity 1320 of the housing 1102 extends from the second cavity 1314 of the housing 1102 to the exterior surface 1306 of the housing 1102. The fifth cavity 1320 of the housing 1102 defines and/or includes a first example fluid outlet 1334 of the multidirectional vent limiting device 1100. The sixth cavity 1322 of the housing 1102 also extends from the second cavity 1314 of the housing 1102 to the exterior surface 1306 of the housing 1102. The sixth cavity 1322 of the housing 1102 defines and/or includes a second example fluid outlet 1336 of the multidirectional vent limiting device 1100.

In the illustrated example of FIGS. 11-14, the fifth cavity 1320 and/or the first fluid outlet 1334 extend(s) radially from the central axis 1310 of the housing 1102 in a first direction that is opposite to a second direction in which the sixth cavity 1322 and/or the second fluid outlet 1336 extend(s) radially from the central axis 1310 of the housing 1102. In other examples, the housing 1102 may include additional and/or fewer fluid outlets relative to the number of fluid outlets shown and described in connection with the multidirectional vent limiting device 1100 of FIGS. 11-14. Furthermore, the fluid outlet(s) and/or the cavit(ies) that define the fluid outlet(s) may extend from the interior surface 1308 of the housing 1102 to the exterior surface 1306 of the housing 1102 in any direction, orientation and/or configuration.

The spring 1104 of the multidirectional vent limiting device 1100 of FIGS. 11-14 includes an example first end 1338 and an example second end 1340 located opposite the first end 1338. The first end 1338 of the spring 1104 contacts and/or abuts the spring seat 1330 of the second cavity 1314 and/or interior surface 1308 of the housing 1102. The second end 1340 of the spring 1104 contacts and/or abuts a first end (described below) of the poppet 1106 of the multidirectional vent limiting device 1100. As a result of being positioned and/or compressed between the spring seat 1330 of the housing 1102 and the first end of the poppet 1106, the spring 1104 of FIGS. 11-14 biases the poppet 1106 toward an open position (e.g., toward the fluid inlet 1324 and/or the second end 1304 of the housing 1102) in which fluid is able to flow from the fluid inlet 1324, through the first fluid passageway 1326, and out of the first fluid outlet 1334 and/or the second fluid outlet 1336 described above. In the illustrated example of FIGS. 11-14, the spring 1104 has a generally cylindrical shape that defines an example central axis 1342 of the spring 1104. The spring 1104 surrounds part of the axial portion of the stem 1108. In the illustrated example of FIGS. 11-14, the central axis 1342 of the spring 1104 is coaxial with the central axis 1310 of the housing 1102.

The poppet 1106 of the multidirectional vent limiting device 1100 of FIGS. 11-14 includes an example first end 1344 and an example second end 1346 located opposite the first end 1344. The first end 1344 of the poppet 1106 contacts and/or abuts the second end 1340 of the spring 1104 of the multidirectional vent limiting device 1100. The second end 1346 of the poppet 1106 defines and/or includes an example face surface 1348 that faces toward the fluid inlet 1324 of the housing 1102 of the multidirectional vent limiting device 1100.

The poppet 1106 of the multidirectional vent limiting device 1100 of FIGS. 11-14 also includes an example outer surface 1350 (e.g., a peripheral surface) and an example sealing surface 1352. The outer surface 1350 of the poppet 1106 defines a portion of the first fluid passageway 1326 described above. In the illustrated example of FIGS. 11-14, the outer surface 1350 of the poppet 1106 is generally parallel to a spatially-overlapping portion of the first cavity 1312 and/or interior surface 1308 of the housing 1102 that also defines part of the first fluid passageway 1326.

The sealing surface 1352 of the poppet 1106 also defines a portion of the first fluid passageway 1326 described above. In the illustrated example of FIGS. 11-14, the sealing surface 1352 of the poppet 1106 is shaped and/or configured to mate with the complementary-shaped and/or complementary-configured sealing surface 1328 of the first cavity 1312 and/or interior surface 1308 of the housing 1102. The sealing surface 1352 of the poppet 1106 of FIGS. 11-14 accordingly has an angled and/or beveled profile relative to the outer surface 1350 of the poppet 1106, where the degree of the angle and/or bevel is configured to mate and/or match the degree of the angle and/or bevel of the sealing surface 1328 of the first cavity 1312 and/or interior surface 1308 of the housing 1102. In other examples, the sealing surface 1352 of the poppet 1106 may have a different shape and/or profile (e.g., curved, s-shaped, etc.).

The sealing surface 1352 of the poppet 1106 is spaced apart from the complementary-shaped and/or complementary-configured sealing surface 1328 of the first cavity 1312 and/or interior surface 1308 of the housing 1102 when the multidirectional vent limiting device 1100 is in an open position, such as the example open position shown in FIG. 13. When the multidirectional vent limiting device 1100 is in the open position shown in FIG. 13, fluid is able to pass through the first fluid passageway 1326. In contrast, the sealing surface 1352 of the poppet 1106 contacts and/or abuts the complementary-shaped and/or complementary-configured sealing surface 1328 of the first cavity 1312 and/or interior surface 1308 of the housing 1102 when the multidirectional vent limiting device 1100 is in a closed position, such as the example closed position shown in FIG. 14. When the multidirectional vent limiting device 1100 is in the closed position shown in FIG. 14, fluid is prevented from passing through the first fluid passageway 1326.

The poppet 1106 of the multidirectional vent limiting device 1100 of FIGS. 11-14 also includes an example central bore 1354, and an example radial bore 1356 (e.g., a bleed hole). The central bore 1354 of the poppet 1106 is shaped and/or configured to receive a first end of the stem 1108 of the multidirectional vent limiting device 1100. In the illustrated example of FIGS. 11-14, the stem 1108 is rigidly coupled to the poppet 1106 via a threaded connection formed by and/or between a threaded portion (described below) of the first end of the stem 1108 and complementary threading located and/or formed within the central bore 1354 of the poppet 1106. The central bore 1354 of the poppet 1106 defines an example central axis 1358 of the poppet 1106. In the illustrated example of FIGS. 11-14, the central axis 1358 of the poppet 1106 is coaxial with the central axis 1342 of the spring 1104, and further coaxial with the central axis 1310 of the housing 1102.

The radial bore 1356 of the poppet 1106 of FIGS. 11-14 is offset radially from the central axis 1358 of the poppet 1106 of FIGS. 11-14. The radial bore 1356 defines a second example fluid passageway 1360 (e.g., a secondary fluid passageway). In the illustrated example of FIGS. 11-14, fluid is able to pass through the radial bore 1356 and/or the second fluid passageway 1360 regardless of whether the multidirectional vent limiting device 1100 of FIGS. 11-14 is in an open position or a closed position. Thus, fluid is able to pass through the radial bore 1356 and/or the second fluid passageway 1360 even when the first fluid passageway 1326 is closed off (e.g., when the sealing surface 1352 of the poppet 1106 is contacting and/or abutting the complementary-shaped and/or complementary-configured sealing surface 1328 of the first cavity 1312 and/or interior surface 1308 of the housing 1102). Although the example poppet 1106 of FIGS. 11-14 includes a single radial bore 1356 defining a single secondary fluid passageway (e.g., second fluid passageway 1360), in other examples the poppet 1106 of FIGS. 11-14 may include any number of radial bores defining any number of secondary fluid passageways.

The stem 1108 of the multidirectional vent limiting device 1100 of FIGS. 11-14 includes an example first end 1362, an example second end 1364 located opposite the first end 1362, and an example axial portion 1366 located and/or extending between the first end 1362 and the second end 1364. The first end 1362 of the stem 1108 includes an example threaded portion 1368 shaped and/or configured to be received in a complementary threaded portion of the central bore 1354 of the poppet 1106 to rigidly couple the stem 1108 to the poppet 1106. The second end 1364 of the stem 1108 includes an example retaining flange 1370. The retaining flange 1370 of the stem 1108 contacts, abuts and/or is adjacent to the retaining flange seat 1332 of the fourth cavity 1318 of the housing 1102 of the multidirectional vent limiting device 1100 when the multidirectional vent limiting device 1100 is in an open position, such as the example open position shown in FIG. 13. The retaining flange 1370 of the stem 1108 is spaced apart from the retaining flange seat 1332 of the fourth cavity 1318 of the housing 1102 of the multidirectional vent limiting device 1100 when the multidirectional vent limiting device 1100 is in a closed position, such as the example closed position shown in FIG. 14. In some examples, the stem 1108 may be implemented as a bolt or screw, where the retaining flange 1370 of the stem 1108 forms a head of the bolt or screw, and the axial portion 1366 of the stem 1108 forms a shaft of the bolt or screw.

In the illustrated example of FIGS. 11-14, the axial portion 1366 of the stem 1108 has a generally cylindrical shape that defines an example central axis 1372 of the stem 1108. The axial portion 1366 of the stem 1108 extends through the spring 1104 and into and/or through the central bore 1354 of the poppet 1106. The poppet 1106 and the stem 1108 are collectively slidable and/or movable (e.g., in a direction parallel to the central axis 1372 of the stem 1108) within the housing 1102 of the multidirectional vent limiting device 1100. The retaining flange seat 1332 of the fourth cavity 1318 of the housing 1102 forms and/or functions as a first mechanical stop that restricts and/or limits the movement of the poppet 1106 and/or the stem 1108 in a first direction along the central axis 1310 of the housing 1102. The sealing surface 1328 of the first cavity 1312 and/or interior surface 1308 of the housing 1102 forms and/or functions as a second mechanical stop that restricts and/or limits the movement of the poppet 1106 and/or the stem 1108 in a second direction opposite the first direction along the central axis 1310 of the housing 1102. In the illustrated example of FIGS. 11-14, the central axis 1372 of the stem 1108 is coaxial with the central axis 1358 of the poppet 1106, and further coaxial with the central axis 1342 of the spring 1104 and the central axis 1310 of the housing 1102.

In some examples, the multidirectional vent limiting device 1100 of FIGS. 11-14 may further include an example pressure transducer 1374. The pressure transducer 1374 may sense and/or measure a pressure of a fluid that has passed into and/or through the fluid inlet 1324 of the housing 1102 of the multidirectional vent limiting device 1100 (e.g., from an upper casing of a fluid regulator to which the multidirectional vent limiting device 1100 is coupled). The pressure transducer 1374 may transmit the sensed and/or measured pressure of the fluid to a remote device (e.g., a remotely located control system and/or monitoring device) via a wired and/or wireless communication network.

In some examples, the pressure transducer 1374 may be located within the first cavity 1312 of the housing 1102 of the multidirectional vent limiting device 1100. For example, the pressure transducer 1374 of FIGS. 11-14 is located and/or mounted on a portion of the interior surface 1308 defined by the first cavity 1312 of the housing 1102. In other examples, the pressure transducer 1374 may be located and/or mounted on the face surface 1348 of the poppet 1106 of the multidirectional vent limiting device 1100. In still other examples, the pressure transducer 1374 may be located and/or mounted on the first end 1362 of the stem 1108 of the multidirectional vent limiting device 1100.

In some examples, the multidirectional vent limiting device 1100 of FIGS. 11-14 may further include an example position transducer 1376. The position transducer 1376 may sense and/or measure a position of the poppet 1106 and/or the stem 1108 of the multidirectional vent limiting device 1100 relative to the position of the first cavity 1312 and/or the fourth cavity 1318 of the housing 1102 of the multidirectional vent limiting device 1100. The position transducer 1376 may transmit the sensed and/or measured position of the poppet 1106 and/or the stem 1108 to a remote device (e.g., a remotely located control system and/or monitoring device) via a wired and/or wireless communication network. In some examples, the position transducer 1376 may be implemented as a Hall effect sensor. In other examples, the position transducer 1376 may be implemented as any type of proximity and/or motion sensor, detector and/or switch, including both contact and non-contact proximity and/or motion sensors, detectors and/or switches.

In some examples, the position transducer 1376 (or a portion thereof) may be located and/or mounted on the face surface 1348 of the poppet 1106 of the multidirectional vent limiting device 1100. In other examples, the position transducer 1376 (or a portion thereof) may be located and/or mounted on the outer surface 1350 of the poppet 1106 of the multidirectional vent limiting device 1100. In still other examples, the position transducer 1376 (or a portion thereof) may be located and/or formed within the poppet 1106 of the multidirectional vent limiting device 1100. In still other examples, the position transducer 1376 (or a portion thereof) may be located and/or mounted on the first end 1362 of the stem 1108 of the multidirectional vent limiting device 1100. In still other examples, the position transducer 1376 (or a portion thereof) may be located and/or mounted on the second end 1364 and/or the retaining flange 1370 of the stem 1108 of the multidirectional vent limiting device 1100.

In operation, the multidirectional vent limiting device 1100 of FIGS. 11-14 is coupled to an upper casing of a fluid regulator. A flow of a fluid from the upper casing of the fluid regulator is received at the fluid inlet 1324 of the housing 1102 of the multidirectional vent limiting device 1100. A force generated by the flowing fluid results in a pressure being applied across the face surface 1348 of the poppet 1106 of the multidirectional vent limiting device 1100.

When the force associated with the pressure applied across the face surface 1348 of the poppet 1106 does not exceed the biasing force generated by the spring 1104 of the multidirectional vent limiting device 1100, the sealing surface 1352 of the poppet 1106 is spaced apart from the sealing surface 1328 of the first cavity 1312 and/or interior surface 1308 of the housing 1102. When such spacing and/or separation is present, the multidirectional vent limiting device 1100 is in an open position (e.g., the open position shown in FIG. 13), and fluid passes through the first fluid passageway 1326 as well as the second fluid passageway 1360 described above. In such instances, the second end 1364 and/or retaining flange 1370 of the stem 1108 is recessed within the fourth cavity 1318 of the housing 1102. This recessed position of the second end 1364 and/or the retaining flange 1370 of the stem 1108 provides a visual indication of the multidirectional vent limiting device 1100 being in an open position.

When the force associated with the pressure applied across the face surface 1348 of the poppet 1106 exceeds the biasing force generated by the spring 1104 of the multidirectional vent limiting device 1100, the sealing surface 1352 of the poppet 1106 contacts and/or abuts the sealing surface 1328 of the first cavity 1312 and/or interior surface 1308 of the housing 1102. When such contact and/or abutment is present, the multidirectional vent limiting device 1100 is in a closed position (e.g., the closed position shown in FIG. 14), and fluid no longer passes through the first fluid passageway 1326 (e.g., the first fluid passageway 1326 is closed and/or shut off). Instead, the flow of fluid is limited and/or restricted to the second fluid passageway 1360 (e.g., through the radial bore 1356 of the poppet 1106). In such instances, the second end 1364 and/or retaining flange 1370 of the stem 1108 protrudes from the fourth cavity 1318 of the housing 1102 and/or extends beyond the first end 1302 of the housing 1102. This protruding and/or extended position of the second end 1364 and/or the retaining flange 1370 of the stem 1108 provides a visual indication of the multidirectional vent limiting device 1100 being in a closed position.

Figure 15:
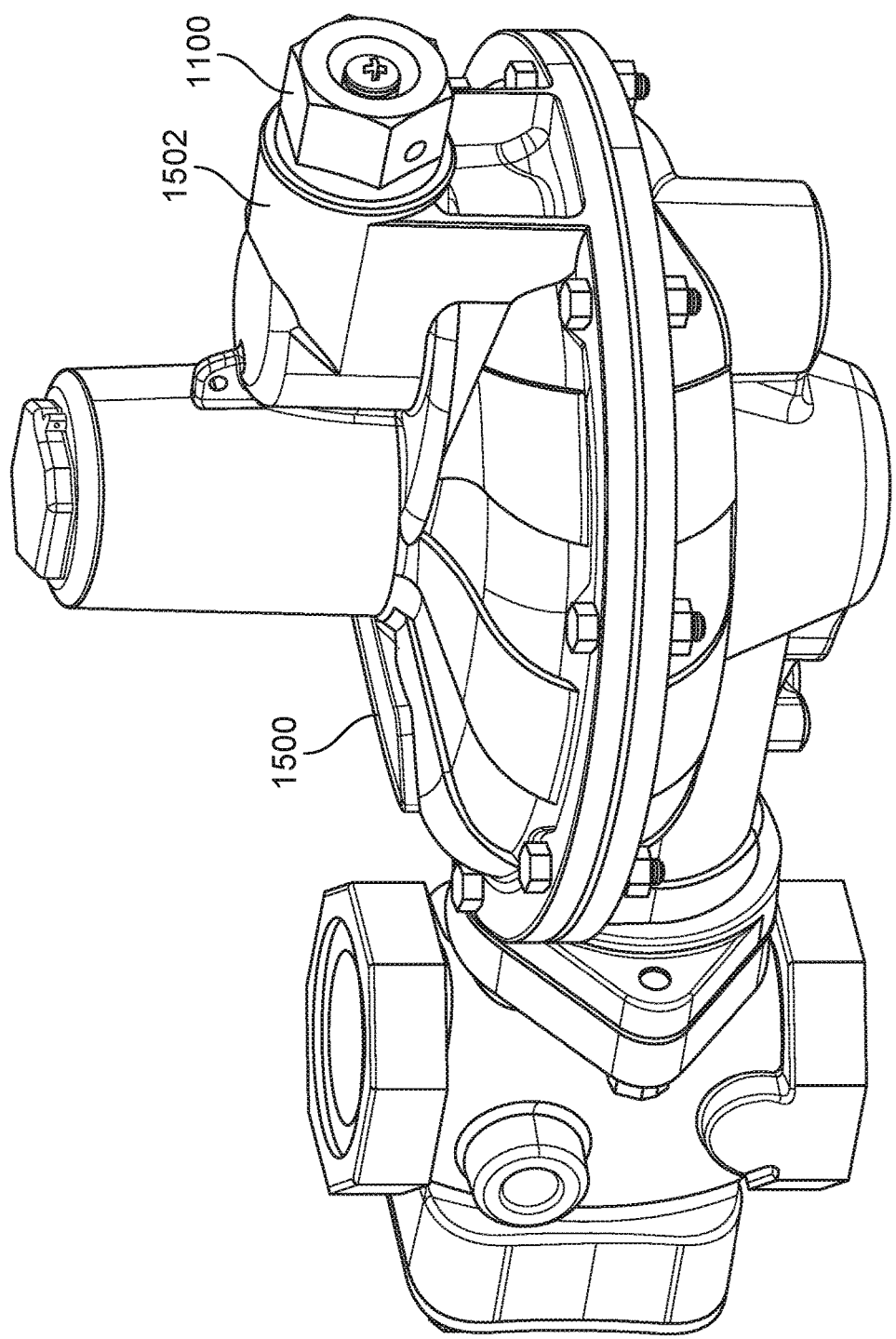
FIG. 15 is a perspective view of the third example multidirectional vent limiting device of FIGS. 11-14 coupled in an example non-vertical orientation to an example fluid regulator.

The operation of the multidirectional vent limiting device 1100 of FIGS. 11-14 is not dependent upon the orientation in which the multidirectional vent limiting device 1100 is installed and/or coupled to the fluid regulator. The multidirectional vent limiting device 1100 is accordingly operable in any orientation, including vertical orientations (e.g., orientations in which the central axis 1310 of the housing 1102 of the multidirectional vent limiting device 1100 is aligned with the downward direction of a gravitational force) as well as horizontal and/or other non-vertical orientations (e.g., orientations in which the central axis 1310 of the housing 1102 of the multidirectional vent limiting device 1100 is not aligned with the downward direction of a gravitational force). FIG. 15 is a perspective view of the multidirectional vent limiting device 1100 of FIGS. 11-14 coupled in an example non-vertical orientation to an example fluid regulator 1500. In the illustrated example of FIG. 15, the multidirectional vent limiting device 1100 is coupled to an example upper casing 1502 of the fluid regulator 1500.

From the foregoing, it will be appreciated that the disclosed multidirectional vent limiting devices advantageously include mechanical structures that are operable without regard to the installation orientation of such example multidirectional vent limiting devices on a fluid regulator. The disclosed multidirectional vent limiting devices are accordingly operable in any orientation, including vertical orientations (e.g., orientations in which a central and/or longitudinal axis of the multidirectional vent limiting device is aligned with the downward direction of a gravitational force) as well as horizontal and/or other non-vertical orientations (e.g., orientations in which a central and/or longitudinal axis of the multidirectional vent limiting device is not aligned with the downward direction of a gravitational force).

It will also be appreciated that the disclosed multidirectional vent limiting devices advantageously identify operational state(s) (e.g., open or closed) and/or operational parameter(s) (e.g., pressure, position) associated with one or more structure(s) and/or component(s) (e.g., internal structure(s) and/or component(s)) of the multidirectional vent limiting devices and/or a fluid passing therethrough. In some examples, the disclosed multidirectional vent limiting devices may indicate the operational state(s) and/or operational parameter(s) in a visual manner. For example, an externally-visible component of the multidirectional vent limiting devices may appear in a first position when the multidirectional vent limiting device is open, and in a second position different from the first position when the multidirectional vent limiting device is closed. In other examples, the disclosed multidirectional vent limiting devices may include one or more transducer(s) (e.g., a pressure transducer, a position transducer, etc.) that identify the operational state(s) and/or operational parameter(s) by sensing data associated with the operational state(s) and/or operational parameter(s) and transmitting one or more signal(s) including and/or based on such data to a remotely located device that detects and/or interprets the data included in and/or represented by the transmitted signal(s).

The aforementioned advantages and/or benefits are achieved via the disclosed multidirectional vent limiting devices for use with fluid regulators. In some examples, a first disclosed multidirectional vent limiting device comprises a housing having an interior surface, a fluid inlet, a fluid outlet, and a first fluid passageway in fluid communication with and located between the fluid inlet and the fluid outlet. In some disclosed examples, the interior surface includes a first sealing surface that defines a portion of the first fluid passageway. In some disclosed examples, the first multidirectional vent limiting device further comprises a stem having a first end, a second end located opposite the first end, and an axial portion located between the first end and the second end. In some disclosed examples, the first end of the stem is rigidly coupled to the interior surface of the housing. In some disclosed examples, the first multidirectional vent limiting device further comprises a poppet having a first end, a second end located opposite the first end, a second sealing surface that defines a portion of the first fluid passageway, and a radial bore that defines a second fluid passageway in fluid communication with and located between the fluid inlet and the fluid outlet. In some disclosed examples, the poppet is slidable along the axial portion of the stem between an open position and a closed position. In some disclosed examples, the second sealing surface contacts the first sealing surface when the poppet is in the closed position to close off the first fluid passageway.

In some disclosed examples, the second end of the stem includes a retaining flange and the second end of the poppet includes a face surface. In some disclosed examples, the face surface contacts the retaining flange when the poppet is in the open position and is spaced apart from the retaining flange when the poppet is in the closed position. In some disclosed examples, the first multidirectional vent limiting device further comprises a spring located between the first end of the poppet and a spring seat of the interior surface of the housing. In some disclosed examples, the spring biases the poppet into the open position.

In some disclosed examples, the first multidirectional vent limiting device is operable in a non-vertical orientation. In some disclosed examples, the first multidirectional vent limiting device further comprises a pressure transducer to measure a pressure of a fluid within the housing. In some disclosed examples, the fluid is received from a fluid regulator. In some disclosed examples, the first multidirectional vent limiting device further comprises a position transducer to measure a position of the poppet within the housing. In some disclosed examples, the housing of the first multidirectional vent limiting device is configured to be coupled to a fluid regulator.

In some examples, a second disclosed multidirectional vent limiting device comprises a housing having an interior surface, a fluid inlet, a fluid outlet, and a first fluid passageway in fluid communication with and located between the fluid inlet and the fluid outlet. In some disclosed examples, the interior surface includes a first sealing surface that defines a portion of the first fluid passageway. In some disclosed examples, the second multidirectional vent limiting device further comprises a stem having a first end, a second end located opposite the first end, and an axial portion located between the first end and the second end. In some disclosed examples, the second end of the stem is rigidly coupled to the interior surface of the housing. In some disclosed examples, the second multidirectional vent limiting device further comprises a retaining nut coupled to the first end of the stem. In some disclosed examples, the second multidirectional vent limiting device further comprises a poppet having a first end, a second end located opposite the first end, a second sealing surface that defines a portion of the first fluid passageway, and a radial bore that defines a second fluid passageway in fluid communication with and located between the fluid inlet and the fluid outlet. In some disclosed examples, the poppet is slidable along the axial portion of the stem between an open position and a closed position. In some disclosed examples, the second sealing surface contacts the first sealing surface when the poppet is in the closed position to close off the first fluid passageway.

In some disclosed examples, the second end of the poppet includes a face surface. In some disclosed examples, the face surface contacts the retaining nut when the poppet is in the open position and is spaced apart from the retaining nut when the poppet is in the closed position. In some disclosed examples, the second multidirectional vent limiting device further comprises a spring located between the first end of the poppet and a spring seat of the interior surface of the housing. In some disclosed examples, the spring biases the poppet into the open position.

In some disclosed examples, the second multidirectional vent limiting device is operable when installed in a non-vertical orientation. In some disclosed examples, the second multidirectional vent limiting device further comprises a pressure transducer to measure a pressure of a fluid within the housing. In some disclosed examples, the fluid is received from a fluid regulator. In some disclosed examples, the second multidirectional vent limiting device further comprises a position transducer to measure a position of the poppet within the housing. In some disclosed examples, the housing of the second multidirectional vent limiting device is configured to be coupled to a fluid regulator.

In some examples, a third disclosed multidirectional vent limiting device comprises a housing having an interior surface, a fluid inlet, a fluid outlet, and a first fluid passageway in fluid communication with and located between the fluid inlet and the fluid outlet. In some disclosed examples, the interior surface includes a first sealing surface that defines a portion of the first fluid passageway. In some disclosed examples, the third multidirectional vent limiting device further comprises a stem having a first end, a second end located opposite the first end, and an axial portion located between the first end and the second end. In some disclosed examples, the third multidirectional vent limiting device further comprises a poppet having a first end, a second end located opposite the first end, a second sealing surface that defines a portion of the first fluid passageway, and a radial bore that defines a second fluid passageway in fluid communication with and located between the fluid inlet and the fluid outlet. In some disclosed examples, the first end of the stem is rigidly coupled to the poppet. In some disclosed examples, the poppet is slidable in an axial direction within the housing between an open position and a closed position. In some disclosed examples, the second sealing surface contacts the first sealing surface when the poppet is in the closed position to close off the first fluid passageway.

In some disclosed examples, the second end of the stem includes a retaining flange. In some disclosed examples, the retaining flange is visible from outside of the housing. In some disclosed examples, the retaining flange contacts a retaining flange seat of the housing when the poppet is in the open position and is spaced apart from the retaining flange seat when the poppet is in the closed position. In some disclosed examples, the spacing provides a visual indication of the poppet being in the closed position. In some disclosed examples, the third multidirectional vent limiting device further comprises a spring located between the first end of the poppet and a spring seat of the interior surface of the housing. In some disclosed examples, the spring biases the poppet into the open position.

In some disclosed examples, the third multidirectional vent limiting device is operable in a non-vertical orientation. In some disclosed examples, the third multidirectional vent limiting device further comprises a pressure transducer to measure a pressure of a fluid within the housing. In some disclosed examples, the fluid is received from a fluid regulator. In some disclosed examples, the housing of the third multidirectional vent limiting device is configured to be coupled to a fluid regulator.

Although certain example apparatus and methods have been disclosed herein, the scope of coverage of this patent is not limited thereto. On the contrary, this patent covers all apparatus and methods fairly falling within the scope of the claims of this patent.

What is claimed is:

1. A vent limiting device, comprising:
a housing having an interior surface, a fluid inlet, a fluid outlet, and a first fluid passageway in fluid communication with and located between the fluid inlet and the fluid outlet, the interior surface including a first sealing surface that defines a portion of the first fluid passageway;
a stem having a first end, a second end located opposite the first end, and an axial portion located between the first end and the second end, the first end of the stem being rigidly coupled to the interior surface of the housing, the second end of the stem including a retaining flange; and
a poppet having a first end, a second end located opposite the first end, a second sealing surface that defines a portion of the first fluid passageway, and a bore that defines a second fluid passageway in fluid communication with and located between the fluid inlet and the fluid outlet, the poppet being slidable along the axial portion of the stem between an open position and a closed position, the second sealing surface to contact the first sealing surface when the poppet is in the closed position to close off the first fluid passageway, the second end of the poppet including a face surface, the face surface to contact the retaining flange when the poppet is in the open position and to be spaced apart from the retaining flange when the poppet is in the closed position, the retaining flange forming a mechanical stop configured to limit movement of the poppet along the stem.

2. The vent limiting device of claim 1, further comprising a spring located between the first end of the poppet and a spring seat of the interior surface of the housing, the spring to bias the poppet into the open position.

3. The vent limiting device of claim 1, wherein the vent limiting device is operable in a non-vertical orientation.

4. The vent limiting device of claim 1, further comprising a pressure transducer to measure a pressure of a fluid within the housing, the fluid to be received from a fluid regulator.

5. The vent limiting device of claim 1, further comprising a position transducer to measure a position of the poppet within the housing.

6. The vent limiting device of claim 1, wherein the housing is configured to be coupled to a fluid regulator.

7. A vent limiting device, comprising: a housing having a closed end, an open end located opposite the closed end and having a fluid inlet, an exterior surface extending between the closed end and the open end and having a fluid outlet, an interior surface, and a first fluid passageway in fluid communication with and located between the fluid inlet and the fluid outlet, the interior surface including a first sealing surface that defines a portion of the first fluid passageway; a stem having a first end, a second end located opposite the first end, and an axial portion located between the first end and the second end, the first end of the stem being rigidly coupled to the interior surface of the housing, the second end of the stem including a retaining flange; and a poppet having a first end, a second end located opposite the first end, a second sealing surface that defines a portion of the first fluid passageway, and a bore that defines a second fluid passageway in fluid communication with and located between the fluid inlet and the fluid outlet, the poppet being slidable along the axial portion of the stem between an open position and a closed position, the second sealing surface to contact the first sealing surface when the poppet is in the closed position to close off the first fluid passageway, the second end of the poppet including a face surface, the face surface to contact the retaining flange when the poppet is in the open position and to be spaced apart from the retaining flange when the poppet is in the closed position, the retaining flange forming a mechanical stop configured to limit movement of the poppet along the stem.

8. The vent limiting device of claim 7, further comprising a spring located between the first end of the poppet and a spring seat of the interior surface of the housing, the spring to bias the poppet into the open position.

9. The vent limiting device of claim 7, wherein the vent limiting device is operable in a non-vertical orientation.

10. The vent limiting device of claim 7, further comprising a pressure transducer to measure a pressure of a fluid within the housing, the fluid to be received from a fluid regulator.

11. The vent limiting device of claim 7, further comprising a position transducer to measure a position of the poppet within the housing.

12. The vent limiting device of claim 7, wherein the housing is configured to be coupled to a fluid regulator.

13. A vent limiting device, comprising: a housing having a first end, a second end located opposite the first end and having a fluid inlet, an exterior surface extending between the first end and the second end and having a fluid outlet, an interior surface, and a first fluid passageway in fluid communication with and located between the fluid inlet and the fluid outlet, the interior surface including a first sealing surface that defines a portion of the first fluid passageway; a stem having a first end, a second end located opposite the first end, and an axial portion located between the first end and the second end, the first end of the stem being rigidly coupled to the interior surface of the housing, the second end of the stem including a retaining flange; and a poppet having a first end, a second end located opposite the first end, a second sealing surface that defines a portion of the first fluid passageway, and a bore that defines a second fluid passageway in fluid communication with and located between the fluid inlet and the fluid outlet, the poppet being slidable along the axial portion of the stem between an open position and a closed position, the second sealing surface to contact the first sealing surface when the poppet is in the closed position to close off the first fluid passageway, the second end of the poppet including a face surface, the face surface to contact the retaining flange when the poppet is in the open position and to be spaced apart from the retaining flange when the poppet is in the closed position, the retaining flange forming a mechanical stop configured to limit movement of the poppet along the stem.

14. The vent limiting device of claim 13, further comprising a spring located between the first end of the poppet and a spring seat of the interior surface of the housing, the spring to bias the poppet into the open position.

15. The vent limiting device of claim 13, wherein the vent limiting device is operable in a non-vertical orientation.

16. The vent limiting device of claim 13, further comprising a pressure transducer to measure a pressure of a fluid within the housing, the fluid to be received from a fluid regulator.

17. The vent limiting device of claim 13, further comprising a position transducer to measure a position of the poppet within the housing.

18. The vent limiting device of claim 13, wherein the housing is configured to be coupled to a fluid regulator.

* * * * *